United States Patent [19]
Sieber et al.

[11] Patent Number: 5,693,254
[45] Date of Patent: Dec. 2, 1997

[54] CESIUM-ZINC HALIDE PHOSPHORS, PHOSPHOR SCREENS, AND PREPARATION METHODS

[75] Inventors: Kurt D. Sieber; Lisa B. Todd, both of Rochester, N.Y.

[73] Assignee: Eastman Kodak Company, Rochester, N.Y.

[21] Appl. No.: 672,606

[22] Filed: Jun. 28, 1996

[51] Int. Cl.$^6$ .................................................. C09K 11/61
[52] U.S. Cl. ........................ 252/301.4 H; 250/370.09; 250/484.4; 252/301.6 R
[58] Field of Search ............... 252/301.4 H, 30.6 R; 256/370.09, 484.4

[56] References Cited

U.S. PATENT DOCUMENTS

| | | | |
|---|---|---|---|
| 4,637,898 | 1/1987 | DeBoer et al. | 252/301.36 |
| 4,780,376 | 10/1988 | Nakamura | 428/691 |
| 5,028,509 | 7/1991 | Shimada et al. | 430/139 |

FOREIGN PATENT DOCUMENTS 0 290 289  11/1988  European Pat. Off. .

OTHER PUBLICATIONS

L. Pelsers, et al "New F-Type Color Center in CsBr", *Physical Review*, vol. 188, pp. 1324–1328, Dec. 1969.

Radhakrishnan et al, "Thermoluminescence of CsCl: Eu Crystals Irradiated with y-Rays", *Phys. Stat. Sol. (a)*, vol. 141, pp. 457–462, 1994 no month.

Kano et al, "Laser-stimulable transparent CsI:Na film for a high quality x-ray imaging sensor":*Appl. Phys. Lett.*, vol. 48, pp. 1117–1118, Apr. 1986.

Lanver, et al., "Luminescence Spectra of Mn(II) in Different Symmetries" *Journal of Luminescence*, 17, pp. 225–235, 1978 no month.

Nanto, et al, "Eu-doped KCl phosphor crystals as a storage material for two-dimensional ultraviolet-ray or x-ray imaging sensors", *J. Appl. Phys.* 75 (11), pp. 7493–7497, Jun. 1994.

Nanto, et al., "Two-dimensional X-ray sensor utilizing photostiumulated luminescence in europium-doped potassium chloride single crystals", *SPIE* vol. 1736 X-Ray Detector Physics ad Applications, pp. 10–20, 1992 no month.

Lanver et al, "Luminesecence Spectra if Mn(II) In Different Symmetries", Jour. Lumine., 17, pp. 225–235, 1978.

Kovaleva et al, "Phase Relationships in the CsBr–MBr$_2$ (M=zn, Cd, Hg) Systems", Inorg. Mater., vol. 31(12), pp. 1442–1446, 1995 no month.

*Primary Examiner*—Melissa Bonner
*Attorney, Agent, or Firm*—Carl O. Thomas

[57] ABSTRACT

Phosphor screens, cesium-zinc halide phosphors, and preparation methods. The phosphor screens comprising a support and a luminescent portion including phosphor comprising oxygen and a combination of species characterized by the relationship:

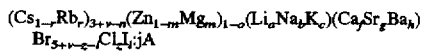

$$(Cs_{1-r}Rb_r)_{3+v-n}(Zn_{1-m}Mg_m)_{1-o}(Li_aNa_bK_c)(Ca_fSr_gBa_h)Br_{5+v-z}Cl_zI_i:jA$$

wherein A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof; r is from 0 to 1; v is from about −0.01 to about +1; n is from 0 to about 1.5; n=a+b+c; m is from 0 to 0.5; o=f+g+h; a is from 0 to 0.3; b is from 0 to 0.75; c is from 0 to 0.75; f is from 0 to 0.25; g is from 0 to 0.5; h is from 0 to 0.5; z+i is from 0 to 5; z is from 0 to 5; i is from 0 to 0.5; and j is from 0 to 0.15.

36 Claims, No Drawings

CESIUM-ZINC HALIDE PHOSPHORS, PHOSPHOR SCREENS, AND PREPARATION METHODS

FIELD OF THE INVENTION

The invention relates to radiography and radiographic phosphors. The invention more particularly relates to cesium-zinc halide phosphors, phosphor screens, and preparation methods.

BACKGROUND OF THE INVENTION

Phosphors have long been used in a variety of articles that can be referred to as "phosphor screens" or "phosphor-based radiation converters", articles that include a support and a phosphor-containing luminescent portion, and function to screen or capture X-rays and other high energy radiation for emission at a longer wavelength, either immediately or on a delayed basis following secondary stimulation. Information represented by the modulation of the captured radiation is reproduced in the emitted longer wavelength radiation. (As a matter of convenience, these articles are referred to generically herein as "phosphor screens" or "screens". A variety of different types of phosphor screens are commonly used including, for example, phosphor-based radiographic panels or screens, dosimeter elements, and optical information storage elements.

Many types of phosphor screen are used to detect image-wise X-radiation absorption by a target interposed between the phosphor screen and an X-ray source. A widely used variety of phosphor screen is a radiographic phosphor panel or screen. These articles are rigid or flexible sheet or plates having a thin luminescent layer that contains a radiographic phosphor. Flexible radiographic phosphor screens are generally exposed while flat, but can be utilized while bent into a cylinder or more complex shape, particularly for industrial applications. Like many other crystalline materials, radiographic phosphors have a crystal matrix which allows for the replacement of some atoms by other similar atoms, but does not readily accept other atoms or moieties. Radiographic phosphor screens can be classified, based upon their phosphors, as prompt emission screens and image storage screens.

Intensifying screens are the most common prompt emission screens. Intensifying screens are used to generate visible light upon exposure of the intensifying screen to X-radiation. A sheet of photographic film is positioned to intercept the visible light generated and commonly is pressed against the intensifying screen within a light-tight cassette. Other prompt emission screens operate similarly, but in place of the photographic film have some other means for visualizing the X-radiation.

Storage screens have storage phosphors, that have the capability of storing latent X-ray images for later release, apparently by locally trapping electron-hole pairs created by incident X-rays. Storage phosphors are distinguishable from the phosphors used in X-ray intensifying or conversion screens. In the latter, a latent image is not stored and X-radiation causes the immediate release of visible light from irradiated phosphor crystals. Storage phosphors generally exhibit some prompt emission, but at relatively low levels in comparison to phosphors intended for that purpose.

Radiation image storage screens are used in computed radiography. The screen is first exposed to X-radiation to create a latent image. The screen is then stimulated with longer wavelength radiation, resulting in the emission of radiation at a third wavelength. Typically a laser having a red or infrared beam is scanned over the screen, resulting in the emission of green or blue radiation. The emitted light is collected and the resulting signal is processed electronically to produce a final image.

X-ray storage phosphors and image storage screens are characterized by a number of properties including sensitivity, efficiency, linearity, resolution, noise, dark decay (the ability of the phosphor or screen to retain the image over time), and emission lifetime. It is generally desired that the sensitivity of the photostimulated luminescence of the screen or screen be made as high as possible to decrease the exposure dose for the patient while maintaining high image quality.

In phosphor screens, differences in the average index of refraction between phosphor crystals and the polymeric binder in which the crystals are dispersed, lead to light scattering, resulting in lower resolution and increased noise in the visible light image produced by the screen. Light scattering is greatly reduced if the phosphor and binder have substantially the same refractive index.

E.P. Patent Application No. 0 290 289 A1 discloses a digital radiographic imaging system including a phosphor screen in which a luminescent layer is optically coupled to a charge coupled device or the like. The luminescent layer has barium fluorohalide storage phosphor and a refractive index matched binder.

U.S. Pat. No. 4,637,898 discloses x-ray intensifying screens in which phosphor crystals and the polymeric binder have substantially the same index of refraction. One of the phosphors disclosed is RbI:Tl.

A variety of types of compounds containing cesium or rubidium and halide are known. Characteristics vary among the different materials.

"Phase Relationships in the Cs—Br—$MBr_2$ (M=Zn, Cd, Hg) Systems", Kovaleva, et al., *Inorganic Materials*, Vol. 31, (1995) pp. 1442–1446 discloses crystal data for a variety of different cesium-metal bromides.

"New F-Type Color Center in CsBr", L. Pelsers, et al., *Physical Review*, Vol. 188, (1969) pp. 1324–1328; discloses luminescent CsBr crystals doped with Cl⁻ or F⁻.

"Thermoluminescence of CsCl:Eu Crystals Irradiated with γ-Rays", J. K. Radhakrishinan et al., *Phys. Stat. Sol. (a)*, Vol. 141, (1994) pp. 457–462; discloses CsCl:Eu phosphors which exhibit thermoluminescence.

"Laser-stimulable transparent CsI:Na film for a high quality x-ray imaging sensor", Tsuyoshi Kano, et al., *Appl. Phys. Lett.*, Vol. 48, (1986) pp. 1117–1118; discloses an x-ray sensor having a transparent film of the phosphor CsI:Na.

U.S. Pat. No. 4,780,376 discloses storage panels having phosphors defined by the formula:

$$CsX.aRbX':xEu^{2+}$$

where X and X' are halogen selected from Cl, Br, and I; and $0 < a \leq 10.0$ and $0 < x \leq 0.2$.

U.S. Pat. No. 5,028,509 discloses storage panels having phosphors defined by the formula:

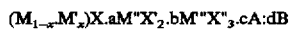
$$(M_{1-x}M'_x)X.aM''X'_2.bM'''X'''_3.cA:dB \quad \text{(formula "(I)")}$$

and by the formula:

$$M'_xX.aM''X'_2.bM'''X'''_3.cA:dB \quad \text{(formula "(I')")}$$

In the formulas, M is Cs or Rb. M' is at least one of Li, Na, K, Cs, and Rb. Phosphors including at least one of Cs and Rb are preferred. M" is selected from Be, Mg, Ca, Sr, Ba, Cd, Zn, Cu, or Ni, preferable Be, Mg, Ca, Sr, or Ba; M'" is a trivalent cation, A is a metal oxide; B is an activator ion like Tl, or Eu; X, X', and X" are each the same or different and are each selected from F, Cl, Br, or I. The ranges are $0 \leq x \leq 1$; $0 \leq a \leq 1$ preferably $0 \leq a \leq 0.4$; $0 \leq b \leq 0.5$ preferably $0 \leq b \leq 10^{-2}$; $0 \leq c \leq 0.5$ preferably $0 \leq c \leq 0.2$; $0 \leq d \leq 0.2$ preferably $10^{-6} \leq d \leq 0.1$. There are no examples of any storage phosphors containing Zn.

"Luminescence Spectra of Mn(II) in Different Symmetries", U. Lanver and G. Lehmann, *Journal of Luminescence*, 17, (1978) pp. 225–235 describes the luminescence of $Cs_3ZnBr_5$:Mn and $Cs_3ZnBr_5$:Mn under UV excitation. No photostimulable luminescence is reported.

A continuing need exists for phosphor screens which can provide useful storage characteristics in combination with reduced light scattering. It would thus be desirable to provide such screens, phosphors, and preparation methods.

SUMMARY OF THE INVENTION

The invention is defined by the claims. The invention, in its broader aspects, provides phosphor screens, cesium-zinc halide phosphors, and preparation methods. The phosphor screens comprising a support and a luminescent portion including phosphor comprising oxygen and a combination of species characterized by the relationship:

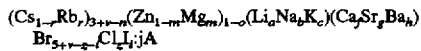

wherein A is selected from the group consisting of Eu, Th, Ce, Tm, Dy, Pr, Ho, Nd, Yb, Er, Gd, Lu, Sm, Y, Tl, Na, Ag, Cu, Mg, Pb, Bi, Mn, and In, and combinations thereof; r is from 0 to 1; v is from about −0.01 to about +1; n is from 0 to about 1.5; n=a+b+c; m is from 0 to 0.5; o=f+g+h; a is from 0 to 0.3; b is from 0 to 0.75; c is from 0 to 0.75; f is from 0 to 0.25; g is from 0 to 0.5; h is from 0 to 0.5; z+i is from 0 to 5; z is from 0 to 5; i is from 0 to 0.5; and j is from 0 to 0.15.

It is an advantageous effect of at least some of the embodiments of the invention that phosphor screens, phosphors, and preparation methods are provided which can provide useful storage characteristics in combination with reduced light scattering.

DESCRIPTION OF PARTICULAR EMBODIMENTS

The phosphor screen of the invention is an article of manufacture that includes a support and a phosphor-containing luminescent portion. The phosphor screen is generally described herein as if the phosphor screen were in the shape of a horizontally disposed flat plate. It is to be understood, however, that the phosphor screen is not limited to any particular shape and that directional terms refer only to relative positions, not an absolution orientation relative to the environment. For example, the phosphor screen can have the form of a rigid planar panel, or a flexible sheet able to assume a variety of shapes, or a rigid cylindrical tube, or a complex three dimensional shape. Similarly, the luminescent portion can have small or large crystals or even a single crystal; held in place by a layer of binder, or adhered in place, or held in place mechanically by fasteners or the like.

The photostimulable phosphors of this invention show a high degree of photostimulated luminescence. Peak photostimulation varies with the relative concentrations of Cl and Br from the infrared to the visible spectrum. This allows the use of various phosphors of the invention with semiconductor diode lasers as well as He—Ne lasers as stimulation sources. For example, the stimulation spectrum of the photostimulated luminescence of $Cs_3ZnCl_5$ and phosphors of the invention is extremely well matched to the He—Ne laser, so these materials are compatible with scanning devices used in computed radiography which currently employ other known storage phosphors like BaFBr:Eu. The stimulation spectrum of the photostimulated luminescence of the $Cs_3ZnBr_5$ phosphors of the invention is in the infrared, allowing the use of semiconductor diode lasers as the stimulation source.

The phosphors of this invention also have an unexpectedly low refractive index at the stimulation wavelength and can be employed in high resolution photostimulable imaging plates where the index of refraction of the binder equals the average index of refraction of the photostimulable phosphor at the stimulation wavelength. The practical advantage of this is to minimize the amount of scattered stimulating radiation during the readout of the imaging plate. When the scatter of the interrogating stimulating light is minimized, an advantage in resolution (MTF) is realized in the digitized image.

The phosphors of the invention include oxygen and a combination of species characterized by the relationship:

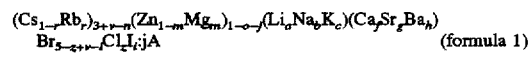
(formula 1)

Each of the designations in this formula are explained below in detail. The same designations appearing elsewhere herein have the same meanings unless specifically stated to the contrary.

Most phosphors can be represented by a stoichiometric formula defining what is generally called a "host lattice", having a particular crystal structure, and possible substitutions within that host lattice. Surprisingly, this is not strictly the case for the phosphor of the invention (hereafter also referred to, for convenience, as "cesium-zinc halide phosphor"). The cesium-zinc halide phosphor has a host lattice that has a variable stoichiometry. This is represented in formula 1 by the term "v". The value of v can vary over a range of from about −0.01 to about +1.

Values of v which are negative are not preferred. The range of v is from 0 to 1.2. For phosphors in which a homogeneous index of refraction is desired so that scattering due to mismatch between the binder and the phosphor is minimized a value of z near 0 is desired. The range of z for this application is from −0.001 to 0.25. The preferred range of z for matched index applications is from 0.0 to 0.1. Satifactory phosphors can be made for use with binders where the index mismatch between the binder and the phosphor is not critical where the range of v is from 0 to 1.2. The preferred range of v for this application is from 0 to 1.

Crystal structure of such materials is similarly not simple and straightforward. These characteristics could be theorized as being incompatible with luminescence; however, in reality the cesium-zinc halide phosphor has good luminescence properties. It has been determined that a preferred value for v, from the viewpoint of storage properties is from about 0.001 to about 1. In most of the following discussion, v will be assumed to be 0 and phosphor having the formula:

(formula 2)

where X is Br, or Cl, or a combination of Br and Cl, is sometimes referred to or otherwise considered herein as if it were the host lattice of the phosphor (hence the term "cesium-zinc halide"). This is a matter of convenience and it will be understood that structural formulas that ignore the value of v are approximations for the sake of discussion and do not preclude embodiments in which v has a non-zero value.

The cesium-zinc halide phosphor is a storage phosphor without an activator. $Cs_3ZnCl_5$, $Cs_3ZnBr_5$, and $Cs_3ZnBr_{5-z}Cl_z$, where 0<z<5 all exhibited intrinsic photostimulable luminescence. The mixed Br and Cl material appears to be a solid solution of the other two materials. This "host lattice" crystallizes in a tetragonal crystal structure like that of cesium cobalt chloride. If j is substantially equal to 0, that is, less than about 0.0001, then z is preferably either from 0 to about 2.5 or z is 5. If j is substantially equal to zero and z ranges from 0 to 5 there is a maximum in the photostimulated luminescent response at around z=2.5 which is totally unexpected.

The cesium-zinc halide phosphor can include activator ("A" in formula 1). Inclusion of an activator will generally improve photostimulated luminescence relative to the unactivated phosphor, and as discussed below in some cases causes differing characteristics with substitutions into the host lattice. A in formula 1 is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof. A suitable concentration range (value of j in formula 1) for the activator is from about 0.0001 to about 0.15, with the range of about 0.0005 to about 0.05 (more particularly 0.0025 to about 0.02) being preferred. Greater concentrations of activator can degrade performance. With activator, the preferred values of z are from about 0 to 1 and about 4.75 to about 5. In formula 1, the value of j is charge compensated by removing an equivalent number of moles of divalent cation for every mole of activator substituted into the phosphor and in the following examples the value of v is considered to be essentially 0; however, it is known to one skilled in the art of phosphor preparation that equivalent phosphors can be prepared without charge compensation just by adding j moles of activator to the phosphor composition because when j is small ($0 \leq j \leq 0.05$) the compositional correction for charge compensation becomes negliable. Therefore, all compositions in which j is not specifically charge compensated are considered equivalent to those in which j is charge compensated when $0 \leq j \leq 0.05$. When the value of v is greater than 0 then when $0 \leq j \leq 0.05$ the charge compensated value of j is also considered to be essentially equal to the non-charge compensated value of j for small values of j.

In $Cs_3ZnBr_{5-z}Cl_z$:Eu there was a region of maximum photostimulated luminescent response in the composition region where $0 \leq z \leq 1.0$. In the composition region where $1.0 < z \leq 5$, the best response is found in the composition region where $4 < z \leq 5$. The maximum in the composition region where $0 \leq z \leq 1.0$ is completely unexpected. The maximum in the composition region where $40 \leq z \leq 5.0$ is completely unexpected.

The stimulation spectra of $Cs_3ZnCl_5$:Eu, $Cs_3ZnBr_5$:Eu, and $Cs_3ZnBr_{5-z}Cl_z$ showed that these phosphors are well matched to the He—Ne laser which emits as 633 nm, and that the primary emitting site is $Eu^{2+}$ in the phosphor lattice. $Cs_3ZnBr_5$:Eu and $Cs_3ZnBr_{5-z}Cl_z$ exhibited extended response in the infrared, beyond 650 nm, and can also be used with semiconductor laser diodes which emit in the infrared. With $Cs_3ZnBr_5$:Eu and $Cs_3ZnBr_{5-z}Cl_z$, the maximum in the stimulated emission spectrum was centered around 450 nm.

The measured lifetimes of the stimulated emission from $Eu^{2+}$ in $Cs_3ZnCl_5$:Eu, $Cs_3ZnBr_5$:Eu, and $Cs_3ZnBr_{5-z}Cl_z$:Eu are competitive with currently known storage phosphors used in single point flying spot scanners.

The phosphor can include some I in place of some of the Br and/or Cl ions. In formula 1, z+i is from 0 to 5 and i is from 0 to about 0.5.

Some or all of the Cs in the phosphor can be substituted for by Rb. In formula 1, r can have a value from 0 to 1. In the non-activated phosphors of the invention, the value of r is less than about 0.001. In the activated phosphors of the invention, the value of r is from 0 to 1. This result is surprising. In the activated phosphors of the invention, when z=0, r is either $r \leq 0.25$ or $r \geq 0.85$ The effect of Rb in the activated phosphor when z=0 is unpredictable and surprising. When z=5, r ranges from 0 to 1. The preferred values of z and r in the activated phosphor are r is either $\leq 0.25$ or $r \geq 0.85$ when $z \leq 1$ and $0 \leq r \leq 1$ when $z \geq 4$. It is obvious that phosphors where r=1, z ranges from 0 to 5 and n (n=a+b+c) does not equal zero will also be storage phosphors. In the case where r=1, when $z \leq 2.5$ the materials crystallize in the same structure type as when z=0.

There is a complete solid solution between the compound $Cs_3ZnCl_5$ and the compound $Rb_3ZnCl_5$. This means that all compounds of the composition $(Cs_{1-r}Rb_r)_3ZnCl_5$ where $0 \leq r \leq 1$ crystallize with the same structure type.

The examples demonstrate that all compounds in the system $(Cs_{1-r}Rb_r)_3ZnCl_5$ show a dramatic enhancement of the PSL when an activator cation like $Eu^{2+}$ is present. It should be noted that $Rb_3ZnCl_5$:Eu is itseft a storage phosphor and all the previously shown (Li,Na,K) substitution chemistry shown, for instance, in Examples 10, 11, and 35 as well as the chemistry shown in Examples 40, 41, 64, 65, 70, and 75 can be done with $Rb_3ZnCl_5$ also. It is understood in the art that materials which crystallise with very minor distortions in the lattice, for example, a monoclinic distortion of a tetragonal unit cell, are considered to be closely enough related to the undistorted structure as to be considered members of the same structural family and therefore are often called isostructural. In other words, a material does not have to be strictly tetragonal to be considered isostructural with the $Cs_3CoCl_5$ structure.

Example 30d where r=1 and z=0 crystallized in a different structure which has been reported to be orthorhombic and isostructural with $(NH_4)_3ZnCl_5$. (M. Heming, et L., *Zeit. Naturforsch.* vol. 36a, (1981) pp. 286–293) There is a complete solid solution between the compound $Cs_3ZnBr_5$ and the compound $Rb_3ZnBr_5$ up to at least 75 mole % substitution. This means that all compounds of the composition $(Cs_{1-r}Rb_r)_3ZnBr_5$ where $0 < r \leq 0.75$ crystallize with the $Cs_3ZnBr_5$ structure type. Examination of Example 30d using polarizarized optical microscopy showed that the major phase was uniaxial, indicating that the Bravais symmetry is either tetragonal or hexagonal, despite the report in the literature that the crystal system is orthorhombic. We cannot explain this discrepancy. DTA examination of $Rb_3ZnBr_5$ showed that the melting point of the compound is $450° \pm 5°$ C. The melting point of RbBr is 698° C. and the melting point of $ZnBr_2$ is 394° C. The difference in melting points shows that $Rb_3ZnBr_5$ is not an unreacted mixture of the starting materials.

It is clear from the examples that compounds in the system $(Cs_{1-r}Rb_r)_3ZnBr_5$ where $0 \leq r \leq 1$ are all intrinsic storage phosphors. It should be noted specifically that example 30d demonstrates that $Rb_3ZnBr_5$ itself is a storage phosphor which crystallizes with a new structure type.

Examples 30a–d demonstrate that the relative PSL decreases for Rb levels greater than 25 mole % Rb substitution (r=0.25). The lack of response in examples 31d and 31e demonstrates that $(Cs_{1-r}Rb_r)_3ZnBr_5$:Eu where $0.5 \leq r \leq 0.75$ do not show enhanced photostimulated luminescence when Eu is used as an activator. Example 31f demonstrates the $Rb_3ZnBr_5$:Eu is a photostimulable phosphor and demonstrates that related structure types can also show photostimulated luminscence. From Example 82 it is obvious that matched index screens can be prepared using this material.

There is a complete solid solution between the compound $Cs_3ZnBr_{5-z}Cl_z$ and the compound $Rb_3ZnCl_5$. This means that all compounds of the composition $(Cs_{1-r}Rb_r)_3ZnBr_{5-z}Cl_z$ crystallize with the same structure type. Examples 32a,b report the PSL of these materials. It is clear from examples 32a and b that compounds in the system $(Cs_{1-r}Rb_r)_3ZnBr_{5-z}Cl_z$ are all storage phosphors. It should be noted specifically that $Rb_3ZnBr_{5-z}Cl_z$ itself is a storage phosphor and crystallizes with the $Cs_3CoCl_5$ structure on the chloride rich end.

Examples 33a,b demonstrate that all compounds in the system $(Cs_{1-r}Rb_r)_3ZnBr_{5-z}Cl_z$ show an enhancement of the PSL when an activator cation like $Eu^{2+}$ is present. It should be noted that $Rb_3ZnCl_{5-z}Br_z$:Eu is itself a storage phosphor and when z is less than 2.5 this materials crystallizes with the $Cs_3CoCl_5$ structure. In preferred embodiments, r is 0, or greater than 0 and less than about 0.25, or about 1. In preferred embodiments $0 \leq z \leq 0.5$ and in a more preferred embodiment $0 \leq z \leq 0.3$.

Under some conditions, photostimulable luminescence can be observed in the phosphor doped with alkali metals, alkaline earth metals, or a combination of both. The alkali metals can be one or any combination of the following: Li, Na, K, or Rb. The alkaline earth metals can be one or any combination of the following: Mg, Ca, Sr, or Ba. Finally, the addition of both $Eu^{2+}$ and alkali or alkaline earth metals or both alkali and alkaline earth metals in the phosphor can give an improvement in the photostimulated luminescent response.

The alkali metals Li, Na, and K are not preferred. A most preferred value for n in formula 1 is 0 (n=a+b+c). A preferred range for n is from 0 to about 0.005. Other, less preferred ranges for alkali metal ions are as follows. If j is about 0 and z is about 0.25, then a can be about 0.15. If j is about 0 and z is less than 5, then b can be about 0.3. If j is about 0 and z is from 0 to about 0.25, then b is about 0.15. If j is about 0, z is from 0 to about 0.25, then c is from 0 to about 0.75.

The phosphors of the invention have a concentration of (Li,Na,K) in which n is always less than 1.5. In an embodiment of the invention in which z is greater than about 2.5, n is less than about 0.15. In an embodiment in which z is less than 2.5, n is less than about 0.75, and preferably a is less than 0.15, b is less than 0.75, and c is less than 0.75. The effect of the (Li,Na,K) on PSL depends upon whether activator is present. The presence of (Li,Na,K) in activated phosphors of the invention in a concentration of greater than about 0.05 degrades photostimulated luminescence relative to the same phosphor absent the elevated (Li,Na,K) concentration. With the non-activated phosphor, the (Li,Na,K)s showed results supporting an increases in PSL, in the indicated composition ranges. The presence of lithium at the levels of 25 mole percent or greater is undesirable because it imparts undue water sensitivity to the sample.

It is not advantageous to have lithium present in the phosphor when z>0.25. The presence of Na or K in $Cs_3ZnBr_{5-z}Cl_z$ decreases the response relative to the "host lattice" or activated host lattice. The presence of sodium or potassium in the compounds also results in an undesirable increase in the water sensitivity of the phosphor.

When r is not zero, preferred ranges are that n is less than about 0.75, and preferably a is less than 0.15, b is less than 0.75, and c is less than 0.75. If r is from 0 to 1 then a preferred range is a=b=c=0.0015 (in this case n=0.0045). When z is not equal to either 0 or 5, the influence of the activator when n is not equal to zero is completely unpredictable and does not follow the same behavior found when z=0 or z=5. This result is extremely surprising.

In this invention the value of m can range from 0 to 0.5. The behavior of Mg is the photostimulable phosphor is unpredictable with respect to z. When z=0 the preferred range of m is $0 \leq m \leq 0.25$. When $0 \leq z < 2.5$, the value of m is $0 \leq m \leq 0.25$. When $2.5 \leq z < 5$, the value of m is $0 \leq m \leq 0.10$. When z=5, the preferred range of m is $0 \leq m < 0.05$. This is no surprising. The results demonstrate that all compositions $Cs_3(Zn_{1-m}Mg_m)Br_{5-z}Cl_z$ where $0 \leq m \leq 0.25$ and $0 \leq z < 5$ are photostimulable phosphors.

Examples 40a–40d all crystallized in the same structure type as $Cs_3ZnCl_5$, indicating that there is a complete solid solution between $Cs_3ZnCl_5$ and $Cs_3MgCl_5$ up to 50 mole % substitution of $Mg^{2+}$ for $Zn^{2+}$. All compounds in the solid solution $Cs_3(Zn_{1-m}Mg_m)Cl_5$ are storage phosphors. Examples 42a–42d all crystallized in the same structure type as $Cs_3ZnBr_5$, indicating that there is a complete solid solution between $Cs_3ZnBr_5$ and $Cs_3MgBr_5$ up to 50 mole % substitution of $Mg^{2+}$ for $Zn^{2+}$. When an activator such as $Eu^{2+}$ is present in the phosphor, the photostimulated luminescence is markedly improved, as demonstrated in examples 41, 43, and 45. When j is nonzero, then $0 \leq m \leq 0.25$.

The range of f in the present invention is $0 \leq f \leq 0.5$ for $0 \leq z \leq 0.5$. When no activator is present, the preferred range of f is $0 \leq f \leq 0.1$ and $0.25 \leq f \leq 0.5$ when z=5. When an activator is present, for the range of $0 \leq z \leq 5$, the preferred range of f is $0 \leq f \leq 0.25$ and more preferably $0 \leq f \leq 0.1$. Compounds of the composition $Cs_3(Zn_{1-f}Ca_f)Br_{5-z}Cl_z$ are storage phosphors. Enhanced photostimulated emission is observed with an activator cation like $Eu^{2+}$ in $Cs_3(Zn_{1-f}Ca_f)Br_{5-z}Cl_z$.

The range for g in the present invention is $0 \leq g \leq 0.5$. In the absence of activator, when z=0, the preferred range for g is $0 \leq g \leq 0.05$. In the absence of activator, when z=5, the preferred range for g is $0.1 \leq g \leq 0.5$. In the presence of activator when z=0 or z=5, the preferred range for g is also $0 \leq g \leq 0.05$. It is completely unexpected that in the absence of an activator when 0<z<5 the range of g is $0 \leq g < 0.05$ whereas in the presence of an activator when 0<z<5 the range of g is broadened to $0 \leq g \leq 0.1$. Compounds of the composition $Cs_3(Zn_{1-g}Sr_g)Br_{5-z}Cl_z$ are storage phosphors.

The value of h in the invention ranges from 0 to 0.5. In the absence of activator when z=0 the preferred range of h is $0 \leq h \leq 0.25$. In the absence of activator when z=5 the preferred range of h is $0 \leq h \leq 0.5$. In the absence of activator when $0 < z \leq 2.5$ the preferred range for h is $0 \leq h \leq 0.05$. In the absence of activator when 2.5<z<5, the preferred range for h is $0 \leq h \leq 0.1$. When activator present and z=0 the preferred range for h is $0 \leq h \leq 0.1$. When activator is present and z=5, the preferred range for h is $0 \leq h \leq 0.5$. When $0 < z \leq 2.5$ the preferred range for h is $0 \leq h \leq 0.2$. When 2.5<h<5 the preferred range for h is $0 \leq h \leq 0.25$. The range of h in the presence and absence of the activator is unpredictable. $Cs_3(Zn_{1-h}Ba_h)Br_{5-z}Cl_z$ phosphors are intrinsic storage phosphors. $Cs_3(Zn_{1-h}Ba_h)Cl_5$ and $Cs_3(Zn_{1-h}Ba_h)Br_{5-z}Cl_z$ show photostimulated luminescent response which is superior to that of undoped $Cs_3ZnCl_5$.

Phosphors in the system $Cs_3(Zn_{1-m}Mg_m)_{1-o}(Ca_fSr_gBa_h)_oBr_{5-z}Cl_z$ where o=(f+g+h) are all intrinsic storage phosphors. Any combination of alkaline earth metals can be used to prepare a wide variety of materials containing various ratios of alkaline earth metals, all of which crystallize with the $Cs_3ZnBr_5$ structure, all of which are photostimulable phosphors. Compounds in the system $Cs_3(Zn_{1-m}Mg_m)_{1-o-j}(Ca_fSr_gBa_h)Br_{5-z}Cl_z$:jEu where o=(f+g+h) and j>0 show dramatically enhanced photostimulated luminescence when the activator $Eu^{2+}$ is present in the compound. The range for o in the present invention is $0 \leq o < 0.5$ when $0 \leq z \leq 5$ and $0 \leq m < 0.5$ and $0 \leq f < 0.25$, $0 \leq g < 0.5$, and $0 \leq h < 0.5$. The preferred ranges are $0 \leq f < 0.25$, $0 \leq g < 0.05$, and $0 \leq h < 0.25$. The influence of activator when z=0 or z=5 and n>0 is completely unpredictable, as demonstrated by examples 64–67. Furthermore, when 0<z<5 then influence of activator when o>0 is completely unpredictable, as shown by examples 68 and 69.

Examples 70–75 show that for $0 \leq z \leq 5$, o and n are not mutually exclusive variables and that both may have nonzero values within the previously discussed ranges. It is also shown that the influence of activator is to improve the photostimulated luminescence of these materials.

The average index of refraction of $Cs_3ZnX_5$ based phosphors can be matched using polymers prepared from known photopolymerizable organic monomers, thereby demonstrating that a matched index screen can be prepared using the phosphors of this invention using methods described in the U.S. Pat. No. 4,637,898.

$Cs_3ZnCl_5$, $Cs_3ZnBr_5$, and $Cs_3ZnBr_{5-z}Cl_z$ exhibited average refractive indexes which can be matched using known binders. The index of refraction of the polymer prepared by photopolymerization of the 1-(S-naphthylcarbinyl) thioacrylate monomer described in U.S. Pat. No. 4,637,898 is 1.67 at 633 nm, a commonly used stimulation wavelength. Each of the phosphors of Examples 7–9 has a lower refractive index at 633 nm than this polymer, therefore matched index screens can be prepared using the methods described in U.S. Pat. No. 4,637,898. The results also demonstrate that the index of refraction of the phosphor can be adjusted by changing the z value in $Cs_3ZnBr_{5-z}Cl_z$:Eu. Examples 78 through 82 demonstrate that both unactivated and activated phosphors of the present invention can be used to prepare index matched screens according to the methods described in U.S. Pat. No. 4,637,898. The values of the average refractive index of the phosphor is not substantially affected by the incorporation of addenda. For example, $0 \leq v \leq 0.3$ will not substantially influence the averge refractive index of the phosphor. Similarly, the value of j may range from $0 \leq j \leq 0.05$ and the phosphor will still be suitable for matched index applications. The addition of other addenda expressed by non-zero values of r, n, o, f, g, and h which range from 0 to 0.25 will not substantially affect the use of the phosphor for matched index applications.

The phosphors of the invention can be prepared by the procedures disclosed in the Examples or by other procedures. Materials crystallizing with the $Cs_3ZnX_5$ structure can be prepared by dehydration of an aqueous solution containing the appropriate molar ratios of cations. Dehydration may be accomplished through various means including evaporation, freeze drying, spray drying, and similar methods. It is believed that the cesium-zinc halide phosphors can also be made as free-standing transparent or transluscent photostimulable imaging plates using the methods described in U.S. Pat. No. 2,851,612 and European Patent Application No. 0 369 049, dated 15 Nov. 1988. Both of these procedures utilize hot pressing to prepare highly transparent radiographic plates.

Some of the possible binders which can be used to index match the phosphors of this invention are described in European Patent Application 0 290 298 dated 6 May 1988, and U.S. Pat. No. 4,637,898. The former describes the use of polysulfone polymers to prepare index matched screens and the latter describes the use of photopolymerizable acrylate monomers to prepare the same. The invention includes an improved procedure for preparing a matched index storage phosphor screen for use with a stimulation light source having a predetermined wavelength band, such as in at least one monochromatic wavelength band in the range of from 450 to 1100 nm. A polymeric binder is selected having a specified index of refraction at a particular wavelength band, the phosphor of the invention is then made so that the value of z in the invention is determined by the formula $$z=5((r^1-r^a)/(r^b-r^a))$$

where $r^1$ is the index of refraction of the binder at the wavelength band, $r^a$ is the index of refraction of the phosphor of the invention at the wavelength band when z=5, and $r^b$ is the index of refraction of the phosphor of the invention at the wavelength band when z=0. Negative values of $(r^1-r^a)$ preclude the use of the polymeric binder with the invention for matched index applications but do not preclude the use of the polymeric binder for preparation of a storage phosphor screen.

The luminescent layer includes the composite phosphor in the form of a polycrystalline mass. Typically, a mass of individual particles are distributed in a binder, which gives the mass structural coherence and retains the mass on the support. The size and shape of the phosphor particles are determined, in the same manner as other phosphors, by requirements of a particular use and factors such as manufacturing constraints. Convenient parameters for a phosphor particulate useful in radiographic screens are a median particle size of from 1 to 40 micrometers.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for screen constructions intended to withstand commercial exposure repetitions without loss of structural integrity. For limited or single exposure applications, any minimal amount of binder consistent with structural integrity is satisfactory.

For the highest attainable speeds a white support, such as a titania or barium sulfate loaded or coated support can be employed. Particular reflective supports which offer a balance of speed and sharpness are those containing reflective microlenslets, such as are disclosed in United States Pat. No. 4,912,333 to Roberts, et al. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. With storage screens, it is preferable to include a dye or pigment which absorbs some of the stimulating radiation, generally provided by a laser; but mostly reflects emitted light. U.S. Pat. No. 4,491,736, to Teraoka, teaches the use of such materials in storage screens.

Apart from the phosphor layers and the assembly features described above, the screen can be of any conventional construction. Screens typically have one or more flexible or rigid support layers. Flexible layers are most commonly polymeric. The most common polymeric supports are films of high dimensional integrity, such as poly(ethylene terephthalate) film supports. In a nonflexible screen, support is provided by one or more polymeric layers and by a rigid plate of aluminum or the like.

Metal layers, such as aluminum, enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I.

In some applications it is desired to use a support whose optical properties allow discrimination between the stimulating radiation and the photostimulated emission. For example, preferential transmission of the stimulating radiation and reflection of the photostimulated emission can be provided by certain types of multilayer dielectric interference filters which may be disposed upon the rigid or flexible support. Similarly transmission of the photostimulated emission and absorption of the stimulating radiation can be provided by using appropriate optical filters as a support such as the commercially available BG-25 filter from the Schott corporation. In matched index applications it is desirable to use a support which provides discrimination between the stimulating radiation and the photostimulated emission to improve the resolution and response of the phosphor layer.

The overcoat layer comprises a binder chosen using the criteria described above for the binder in the luminescent layer. The overcoat binder can be the same binder as in the luminescent layer or different and can also be chosen from polymers useful for supports. Polymers conventionally employed for fill supports can be used in the overcoat layer. For example, cellulose acetate is an overcoat commonly used with the poly(urethane) binders. Overcoat polymers are often also used to seal the edges of the phosphor layer. A suitable overcoat is disclosed in U.S. Pat. No. 5,401,971.

While anticurl layers are not required for the screens, they are generally preferred for inclusion. The function of the anticurl layer is to balance the forces exerted by the layers coated on the opposite major surface of a support which, if left unchecked, could cause the support to assume a nonplanar configuration, that is, to curl or roll up on itself. Materials forming the anticurl layers can be chosen from among those identified above for use as binders and overcoats. Generally an anticurl layer is formed of the same polymer as the overcoat on the opposite side of the support.

Any one or combination of conventional screen features compatible with the features described herein can, of course, be employed. Conventional storage screen constructions are disclosed in U.S. Pat. No. 4,380,702 to Takahashi et at, the disclosure of which is hereby incorporated by reference. Conventional intensifying screen constructions are disclosed in *Research Disclosure*, Vol. 184, August 1979, Item 18431, hereby incorporated herein by reference.

The radiographic screens are formed by conventional coating techniques. Phosphor powder and addenda are mixed with a solution of a resin binder material and coated by means such as blade coating onto a substrate. U.S. Pat. No. 4,505,989, to Umemoto et al, the disclosure of which is hereby incorporated herein by reference, describes suitable techniques known in the art for preparing a radiographic screen.

The phosphor screen of the invention, in some embodiments, is what can be referred to as a "large crystal device". In contrast to a radiographic screen, the mass of small phosphor particles is replaced by a relatively small number of large crystals or even a single very large crystal. The support and binder are replaced by a mechanical structure that holds the crystal or crystals in a desired orientation. The large crystal device can also include a light responsive element, such as an array of photodiodes. The crystals are arranged so that the longest dimension of each crystal is aligned with the direction of incident radiation. This maximizes the thickness, and thus the radiation stopping power, of the phosphor "layer". The crystals together define a surface that faces the direction or directions from which incident radiation is to be received. In many applications, such as computed tomography, it is desirable to capture only radiation incident from a single direction, the direction of the collimated beam used to image the subject matter. In these applications, the crystals define a plane. In some other applications, such as high energy physics detectors, it is desirable to capture radiation emitted in many directions from a particular location and the crystals therefore define a complex curved surface centered upon the site of origin of events to be detected. These multidirectional detectors are otherwise substantially similar to the unidirectional detectors previously described.

The following Examples and Comparative Examples are presented to further illustrate and elucidate some preferred modes of practice of the invention. Unless otherwise indicated, all starting materials were commercially obtained.

Stimulation Spectra:

The stimulation spectrum of the packed powder sample is obtained by exposing the sample for 1 minute to x-radiation from a tungsten target x-ray tube operated at 55 kV, 33 mA, filtered through $\frac{1}{32}$" Al. After a delay of several minutes the sample is placed in a stimulation apparatus. The sample is subjected to sequential 15 ms long pulses of weak stimulation light. Stimulation measurements were taken every 10 nm. The stimulation radiation used here had a bandpass of 8 nm and was provided by light from a tungsten-halogen lamp which was passed through a monochromator and an order-sorting filter. An CS3-72 filter was used for stimulation wavelengths shorter than 700 nm. An OG550 filter was used for stimulation wavelengths greater than or equal to 700 nm. The stimulated emission is collected and detected by an R928 PMT after passing through CS4-96 and CS7-51 bandpass filters. The spectral correction curve was obtained under these conditions with an NBS-traceable radiometer detector.

Stimulated Emission Spectra:

The stimulated emission spectrum of the packed powder sample is obtained by exposing the sample for 1 minute to unfiltered x-radiation from a tungsten target tube operated at 70 kVp, 30 mA. After a delay of several minutes, the sample is loaded into a spectrofluorometer. 650 nm light from xenon arc lamp which had passed through a monochromator and a RG610 bandpass filter is used as the stimulating radiation. The photostimulated emission from the sample is collected and detected by a calibrated spectrometer. The spectrometer had been calibrated to within ±1 nm and had a resolution of approximately 4 nm (full width at half maximum). The intensity calibration of the spectrometer was performed using two NBS-traceable sources and yielded an arbitrary intensity scale proportional to Watts/nm/cm$^2$ (different from the prompt emission spectra). The photostimulated emission at each wavelength are corrected for the emission filter transmission and spectrometer sensitivity.

X-Ray Powder Diffraction:

All preparations were characterized for phase purity using x-ray powder diffraction. Starting materials present in the x-ray powder diffraction pattern of the product were not considered as impurity phases. X-ray powder diffraction patterns were taken using an Enraf Nonius Guinier-DeWolff model 552 camera using Cu k$\alpha_1$ radiation. When quantitative evaluation of the lattice constants from the x-ray pattern was desired, the pattern on the guinier film was digitized using a scanning densitometer and the line positions were corrected using silver as an internal standard. Lattice constants were calculated using a least squares method with a local computer program.

Evaluation of Reponse Time for Photostimulable Phosphors:

The response time (or lifetime) of materials is obtained by irradiating the sample with x-rays from a tungsten tube operating at 70 kVp and 3 mA for several seconds. After x-irradiation the sample is placed at the bottom port of an integrating sphere and subjected to very short pulses of 633 nm light. The stimulated emission is synchronously detected by a photomultiplier tube, (PMT), with appropriate filtration to block the red stimulating light. The signal from the PMT is amplified, then digitized at a rapid rate, (every 20 nanoseconds for a total time of 40 microseconds). The results of several stimulation pulses are averaged together for an improved signal-to-noise ratio. The response time (or lifetime) was taken as the time interval required for the post-stimulation signal to drop to 1/e of its peak value. The response time is measured in microseconds.

Index of Refraction Measurements:

The average index of refraction of a phosphor powder was determined using an optical microscope with a tungsten halogen light source, bandpass filters, and Cargille™ Certified Refractive Index Liquids (R. P. Cargille Laboratories, Inc.) The following procedure was used to determine the average refractive index of a phosphor powder. A microscope slide was prepared containing a small amount of the ground sample immersed in one of the Certified Refractive Index Liquids. The sample was examined on the microscope using illumination from the tungsten halogen light source which had passed through a bandpass filter, (50 nm bandwidth interference type). The average refractive index of the sample was taken to be equal to the value of the Certified Refractive Index Liquid when the sample showed a minimum of optical scatter when immersed in the fluid. The actual refractive index of the immersion fluid at the wavelength of the bandpass filter was calculated using the Cauchy Equations relating refractive index as a function of wavelength supplied by R. P. Cargille Laboratories for the particular set of Refractive Index Liquid used. The average refractive index measurements were double checked by the Becke method. (*Optical Crystallography (Fifth Edition)* by E. E. Wahlstrom, John Wiley and Sons, New York, N.Y., (1979) pp 120–123)

Evaluation of Photostimulable Luminescence:

Photostimulable luminescent response of the packed powder sample is obtained by first exposing the sample for 3 minutes to a heat lamp to eliminate any residual signal which might be present, then exposing the sample for several seconds to x-radiation from a tungsten target x-ray tube operated at 70 kV, 2.5 mA. The normal filtration conditions used 1⅜" Al as a filter. On occasion the filters were removed for samples with extremely low sensitivity. The typical sample dose varied from 1.5 mRem to 18 Rem. The radiation dose was measured using a Radcal Corp. model 2025 x-ray monitor and probe. After exposure to x-rays, the sample was stimulated with a 4 millisecond pulse from a 12 mW He—Ne laser. The stimulated emission is collected and detected by a PMT with an S-4 response after passing through a Schott BG-25 filter. The peak voltage obtained from the PMT was measured, and the ratio of peak voltage from the PMT divided by the radiation dose was used as a measure of the photostimulable luminescent response.

Differential Thermal Analysis:

The melting point of a sample was determined using differential thermal analysis (DTA) with a Thermit 10C DTA unit. The heating rate was 5° C./min and high purity alumina was used as the reference material.

Preparation of Starting Materials:

Zinc chloride, all alkali metal bromides and chlorides, and all alkaline earth metal bromides and chlorides were dehydrated under vacuum between 100° C. and 200° C. before use. Anhydrous $ZnBr_2$ was prepared by the following two step procedure. In the first step, 15 grams of high purity zinc metal (Atomergic Chemetals Corp. 99.999% zinc shot) is dissolved in 100 mls of concentrated HBr (Eastman Kodak Company ACS reagent) with stirring. The solution is then evaporated to near dryness by gently boiling the liquid. The remaining water on the material is removed by drying under vacuum. In the second step, the zinc bromide is heated under argon saturated with bromine in three steps: 1.5 hours at 90° C., 1.5 hours at 180° C., and finally two hours at 400° C. The melt is cooled to room temperature and the anhydrous product removed from the tube in a glove bag.

Anhydrous $EuBr_2$ was prepared by the method of Cox and Fong (Journal of Crystal Growth, 20, (1973), 233–238) from high purity $Eu_2O_3$, HBr and $NH_4Br$. In a typical preparation, 1 g of $Eu_2O_3$ and 1.5 g $NH_4Br$ is dissolved in 20 mls of concentrated HBr with heat. The solution is evaporated to dryness then transferred to a sublimation tube. The sample is placed under vacuum and successively heated at 90° C. for 6 hrs, 180° C. for 6 hrs, then 400° C. for 12 hrs to dehydrate the material and remove the excess $NH_4Br$. TGA analysis of the product in air verified the composition as anhydrous $EuBr_2$.

Anhydrous $EuCl_3$ was prepared by the method of Cox and Fong (Journal of Crystal Growth, 20, (1973), 233–238) from high purity $Eu_2O_3$, HCl and $NH_4Cl$. In a typical preparation, 1 g of $Eu_2O_3$ and 1.5 g $NH_4Cl$ were dissolved in 20 mls of concentrated HCL with heat. The solution was evaporated to dryness then transferred to a sublimation tube. The sample was placed under vacuum and successively heated at 90° C. for 6 hrs, 180° C. for 6 hrs, then 400° C. for 12 hrs to dehydrate the material and remove the excess $NH_4Cl$. TGA analysis of the product in air verified the composition as anhydrous $EuCl_3$.

Photostimulated luminescence response (PSL) values

Generally, the photostimulated luminescence response of phosphors having species inclusive of the formula, $Cs_3ZnCl_5$ or the formula $Cs_3ZnBr_{5-z}Cl_z$ (where z is greater than 0 and less than 5), are reported herein normalized to the response of $Cs_3ZnCl_5$ in Example 4 (normalizing conversion factor=1726.12198) or in Example 6e (normalizing conversion factor=2316.147605), as indicated. These photostimulated luminescence responses are indicated in the tables by the heading: "PSL (1)". Generally, the response of phosphors having species inclusive of the formula, $Cs_3ZnBr_5$, are reported herein normalized to the response of $Cs_3ZnBr_5$ in Example 5. These photostimulated luminescence responses are indicated in the tables by the heading: "PSL (2)". The PSL (2) normalizing conversion factor is 384.3985444. Any departures from these practices in the following will be understandable from context.

EXAMPLES 1–3

CRYSTAL STRUCTURE OF $Cs_3ZnX_5$ $Cs_3ZnBr_5$ and $Cs_3ZnCl_5$ were determined to crystallize in the $Cs_3CoCl_5$ structure and the tetragonal space group I 4/mcm. This is different from reported alkali halides. Compounds in the system $Cs_3ZnBr_{5-z}Cl_z$ were also determined to crystallize in the same structure. A solid solution was found across the composition region from z=0 to z=5. The unit cell volume of the compounds $Cs_3ZnBr_{5-z}Cl_z$ varied linearly with z. This strongly suggests that, surprisingly, the smaller chloride anion substitutes directly for the larger bromide anion in the solid solution.

Example 1

$Cs_3ZnCl_5$

The sample container for this experiment was a pyrex tube for melt filtration consisting of a small piece of capillary tubing connected to ½" o.d. pyrex tubing on both ends. A plug of glass wool was inserted into one side of the tube to use as a filter for the molten salt. 2.525 g of CsCl and 0.6814 g of $ZnCl_2$ were sealed in the side of the tube equipped with the glass wool plug. The sample was evacuated to better than 10 microns and sealed off. The entire assembly was heated in the vertical position at 624° C. for at least 18 hrs to allow the melt to filter. The product was cooled and removed from the tube, whereupon several clear crystals were separated from the mass.

The crystals were examined using a precession camera and Cu kα radiation. The precession photographs of the single crystal demonstrated that the material was tetragonal with approximate lattice parameters of a=9.12 Å and c=14.45 Å. X-ray powder diffraction photographs taken with a Guinier camera gave precision lattice constants of a=9.240 Å and c=14.487 Å. Results are reported in Table 1. The extinctions observed in the powder diffraction pattern and the single crystal photographs were consistent with the tetragonal space group I 4/mcm.

As a further check for the structure type, the guinier film was digitized and the intensities of the x-ray powder diffraction fines were measured. The intensity of a reflection was taken as the maximum value of the optical density above the baseline for each reflection profile observed during digitization. Values are reported as "I(obs)" in Table 1. Theoretical intensities for the powder pattern were calculated using the computer program LAZYPULVERIX (*J. Appl. Cryst.* (1977) 10, 73–74) available from Klaus Yvon, Wolfgang Jeitschko, and Erwin Parthe of The Laboratoire de Cristallographie aux Rayons X, Universite de Geneve, 24 quai Ernest-Ansermet, CH-1211, Geneve 4, Switzerland, making the assumption that $Cs_3ZnCl_5$ crystallizes with the $Cs_3CoCl_5$ structure. The theoretical intensities for the powder pattern were calculated using previously refined lattice parameters from guinier films. The atomic positions for the $Cs_3CoCl_5$ structure type were taken from a structure of $Cs_3MnCl_5$ reported in "Crystal Structure of $Cs_3MnCl_5$", by J. Goodyear and D. J. Kennedy, *Acta Cryst*, B32 (1976) p. 631. The intensities of the reflections with calculated intensities from the program LAZYPULVERIX using the Guinier diffraction geometry is listed in Table 1 as "I(calc)". The agreement between calculated and observed values shown in Table 1 demonstrates that $Cs_3ZnCl_5$ crystallizes with the $Cs_3CoCl_5$ structure. This crystal structure is not the alkali halide crystal structure seen in reported alkali halide storage phosphors.

$Cs_3ZnCl_5$ was examined using differential thermal analysis (DTA). The DTA of $Cs_3ZnCl_5$ showed a discrete endotherm on the heating cycle which was indicative of melting. The melting point of $Cs_3ZnCl_5$ was 540°±5° C., which is different from that of either CsCl (645° C.) or $ZnCl_2$ (283° C.) demonstrating that the material is a true compound, not a physical mixture of starting materials.

TABLE 1

X-ray Powder Diffraction Results for $Cs_3ZnCl_5$

| (H K L) | D-spacing | I(calc) | I(obs) |
|---|---|---|---|
| (1 1 2) | 4.8488 | 76 | 96 |
| (2 0 0) | 4.6173 | 43 | 62 |
| (2 1 1) | 3.9722 | 317 | 411 |
| (2 0 2) | 3.8947 | 652 | 658 |
| (0 0 4) | 3.6206 | 274 | 342 |
| (2 2 0) | 3.2668 | 263 | 411 |
| (2 1 3) | 3.1396 | 1000 | 1000 |
| (2 2 2) | 2.9769 | 49 | 68 |
| (3 1 0) | 2.9214 | 436 | 575 |
| (2 0 4) | 2.8494 | 76 | 96 |
| (3 1 2) | 2.7098 | 42 | 68 |
| (2 2 4) | 2.4259 | 213 | 274 |
| (2 1 5)(0 0 6) | 2.3719 | 159 | 123 |
| (3 1 4) | 2.2741 | 131 | 178 |
| (1 1 6) | 2.2648 | 46 | 89 |
| (4 1 1) | 2.2148 | 102 | 164 |
| (4 0 2) | 2.2015 | 131 | 137 |
| (3 3 0) | 2.1783 | 74 | 110 |
| (2 0 6) | 2.1402 | 179 | 219 |
| (3 3 2) | 2.0859 | 104 | 123 |
| (4 2 0) | 2.0663 | 179 | 192 |
| (4 1 3) | 2.0331 | 172 | 65 |
| (3 1 6) | 1.8618 | 76 | 107 |
| (2 1 7) | 1.8511 | 27 | 41 |
| (0 0 8) | 1.8117 | 72 | 110 |
| (4 2 4) | 1.7953 | 173 | 178 |
| (4 1 5) | 1.7730 | 70 | 89 |
| (4 0 6) | 1.6697 | 158 | 137 |
| (4 4 0) | 1.6337 | 76 | 68 |
| (5 2 3)(3 3 6) | 1.6176 | 314 | 260 |
| (2 2 8) | 1.5840 | 94 | 96 |
| (6 0 0) | 1.5399 | 122 | 137 |
| (4 1 7) | 1.5210 | 31 | 41 |
| (2 1 9) | 1.5001 | 106 | 96 |
| (4 4 4) | 1.4890 | 35 | 27 |

TABLE 1-continued

X-ray Powder Diffraction Results for $Cs_3ZnCl_5$

| (H K L) | D-spacing | I(calc) | I(obs) |
|---|---|---|---|
| (5 2 5) | 1.4760 | 47 | 55 |
| (5 3 4) | 1.4517 | 70 | 82 |

EXAMPLE 2

$Cs_3ZnBr_5$ 3.179 g of CsBr and 1.126 g of $ZnBr_2$ were placed into a quartz tube and dehydrated under flowing argon at 200° C. to remove excess water. The sample was then evacuated to better than 10 microns and sealed off. The entire assembly was heated in the vertical position using a moving zone furnace which translated over the length of the tube over a period of 36 hours. The temperature at the midpoint of the moving zone furnace was 600° C. The product was cooled and removed from the tube, whereupon several clear crystals were separated from the mass.

The crystals were examined using a precession camera and Cu Kα radiation. The precession photographs of the single crystal demonstrated that the material was tetragonal with the same symmetry as $Cs_3ZnCl_5$. X-ray powder diffraction photographs taken with a Guinier camera gave precision lattice constants of a=9.6384(10) Å and c=15.1373 (10) Å. Results are reported in Table 2. The extinctions observed in the powder diffraction pattern and the single crystal photographs are consistent with the tetragonal space group I 4/mcm.

As a further check for the structure type, the guinier film was digitized and the intensities of the x-ray powder diffraction lines were measured and theoretical intensities were calculated in the same manner as in Example 1. Results are reported in Table 2. The results indicate that $Cs_3ZnBr_5$ crystallizes with the same structure as $Cs_3ZnCl_5$.

$Cs_3ZnBr_5$ was examined using differential thermal analysis (DTA). The DTA of $Cs_3ZnBr_5$ showed a discrete endotherm on the heating cycle which was indicative of melting. The melting point of $Cs_3ZnBr_5$ was 515°±5° C., which is different from that of either CsBr (636° C.) or $ZnCl_2$ (394° C.) demonstrating that the material is a true compound, not a physical mixture of starting materials.

TABLE 2

X-ray Powder Diffraction Results for $Cs_3ZnBr_5$

| (H K L) | D-spacing | I(calc) | I(obs) |
|---|---|---|---|
| (1 1 0) | 6.80471 | 22 | 22 |
| (2 0 0) | 4.81845 | 24 | 22 |
| (2 1 1) | 4.14381 | 33 | 48 |
| (2 0 2) | 4.06435 | 205 | 221 |
| (0 0 4) | 3.78241 | 85 | 95 |
| (2 2 0) | 3.40480 | 181 | 209 |
| (1 1 4) | 3.30850 | 75 | 66 |
| (2 1 3) | 3.27499 | 1000 | 1000 |
| (2 2 2) | 3.10697 | 9 | 11 |
| (3 1 0) | 3.04522 | 454 | 386 |
| (2 0 4) | 2.97430 | 89 | 81 |
| (3 1 2) | 2.82743 | 26 | 29 |
| (2 1 5) | 2.47598 | 65 | 44 |
| (4 1 1) | 2.30920 | 32 | 29 |
| (4 0 2) | 2.29511 | 25 | 15 |
| (3 3 0) | 2.26977 | 69 | 95 |
| (2 0 6) | 2.23340 | 86 | 66 |
| (3 3 2) | 2.17468 | 20 | 7 |
| (4 2 0) | 2.15390 | 140 | 140 |

TABLE 2-continued

X-ray Powder Diffraction Results for $Cs_3ZnBr_5$

| (H K L) | D-spacing | I(calc) | I(obs) |
|---|---|---|---|
| (4 1 3) | 2.11983 | 137 | 118 |
| (4 0 4) | 2.03089 | 85 | 77 |
| (3 1 6) | 1.94221 | 122 | 110 |
| (0 0 8) | 1.89104 | 46 | 22 |
| (4 2 4) | 1.87183 | 99 | 81 |
| (4 1 5) | 1.84997 | 32 | 7 |
| (4 0 6) | 1.74223 | 124 | 73 |
| (4 4 0) | 1.70376 | 82 | 48 |
| (5 2 3) | 1.68630 | 213 | 162 |
| (2 2 8) | 1.65417 | 45 | 29 |
| (6 0 0) | 1.60644 | 100 | 73 |
| (2 1 9) | 1.56687 | 103 | 59 |

EXAMPLES 3a–3g $Cs_3ZnBr_{5-z}Cl_z$

Samples in the system $Cs_3ZnBr_{5-z}Cl_z$ were prepared by adding CsCl, CsBr, $ZnCl_2$, and $ZnBr_2$ (in the amounts indicated in Table 3) into individual quartz tubes and drying under flowing argon for 2 hours at temperatures between 100° C. and 200° C., (except for example 3a, which had no dehydration treatment). The samples were then evacuated to better than 10 microns and sealed. The samples were placed in a moving zone furnace which was translated up and down the entire length of the sample twice in the period of time and at the temperature indicated in Table 3. After the heat treatment, the samples were cooled to room temperature and removed from their containers.

All samples were examined using x-ray powder diffraction. The x-ray diffraction patterns of all samples were strictly isostructural to $Cs_3ZnCl_5$ and $Cs_3ZnBr_5$. Refinement of the unit cells using a least squares method confirmed that all the samples were isostructural with the $Cs_3CoCl_5$ structure type. A listing of the unit cell parameters for the compositions is given in Table 4. The error in the a and c unit cell dimensions is ±0.001 Å.

TABLE 3

Preparation of $Cs_3ZnBr_{5-z}Cl_z$

| Example | z | CsCl (g) | CsBr (g) | $ZnCl_2$ (g) | $ZnBr_2$ (g) | Temp (°C.) | Time (hrs) |
|---|---|---|---|---|---|---|---|
| 3a | 5.0 | 5.0510 | — | 1.3630 | — | 700 | 64 |
| 3b | 4.0 | 3.3672 | 2.1281 | 1.3628 | — | 693 | 8 |
| 3c | 3.0 | 5.0508 | — | — | 2.2519 | 600 | 8 |
| 3d | 2.5 | .8418 | 5.3202 | 1.3628 | — | 693 | 8 |
| 3e | 2.0 | — | 6.3843 | 1.3628 | — | 600 | 8 |
| 3f | 1.0 | 1.6840 | 4.2560 | — | 2.2519 | 693 | 8 |
| 3g | 0.0 | — | 3.1790 | — | 1.1260 | 600 | 36 |

TABLE 4

Unit cell parameters for $Cs_3ZnBr_{5-z}Cl_z$

| Example | z | a (Å) | c (Å) | Cell volume (Å³) |
|---|---|---|---|---|
| 3a | 5.0 | 9.238 | 14.483 | 1235.91 |
| 3b | 4.0 | 9.369 | 14.542 | 1276.43 |
| 3c | 3.0 | 9.460 | 14.636 | 1309.80 |
| 3d | 2.5 | 9.508 | 14.711 | 1329.97 |
| 3e | 2.0 | 9.546 | 14.783 | 1347.19 |

TABLE 4-continued

Unit cell parameters for $Cs_3ZnBr_{5-z}Cl_z$

| Example | z | a (Å) | c (Å) | Cell volume (Å³) |
|---|---|---|---|---|
| 3f | 1.0 | 9.596 | 14.935 | 1375.23 |
| 3g | 0.0 | 9.638 | 15.136 | 1405.88 |

EXAMPLE 4

PSL of $Cs_3ZnCl_5$ 3.788 g of CsCl and 1.022 g of $ZnCl_2$ were placed in a quartz tube and dehydrated under vacuum at between 100° C. and 200° C. The sample was then evacuated to better than 10 microns and sealed off. The sample was heated in the vertical position at 700° C. for 3 hrs then cooled to room temperature over a period of 4 hrs. The product was removed from the tube and lightly ground. X-ray powder diffraction patterns taken of the sample showed that the material crystallized with the $Cs_3CoCl_5$ structure type.

The photostimulated luminescence of the sample was measured as described above and the radiation dose was 15 Rems. The peak response was 869 V and the integrated response was 1.018 V. The ratio of peak response divided by dose is 0.058 V/Rem. This was considered the baseline response of the intrinsic storage properties of $Cs_3ZnCl_5$ and was normalized to 100.

EXAMPLE 5

PSL of $Cs_3ZnBr_5$ 4.7882 g of CsBr and 1.6889 g of $ZnBr_2$ were placed in a quartz tube and dehydrated under vacuum at between 100° C. and 200° C. The sample was then evacuated to better than 10 microns and sealed off. The sample was heated in the vertical position at 700° C. for 3 hrs then cooled to room temperature over a period of 4 hrs. The product was removed from the tube and lightly ground. X-ray powder diffraction patterns taken of the sample showed that the material crystallized with the $Cs_3CoCl_5$ structure type.

The photostimulated luminescence of the sample was measured as described above and the radiation dose was 15 Rems. The peak response was 3.9022 V and the integrated response was 3.6395 V. The ratio of peak response divided by dose was 0.26 V/Rem. This was considered the baseline response of the intrinsic storage properties of $Cs_3ZnBr_5$ and was normalized to 100.

EXAMPLES 6a–6e

PSL of $Cs_3ZnBr_{5-z}Cl_z$

The samples were prepared as follows. The halides were placed in a quartz tube using the amounts of starting reagents reported in Table 5 and dehydrated under vacuum at between 100° C. and 200° C. The sample was then evacuated to better than 10 microns and sealed off. The sample was heated in the vertical position at 700° C. for 3 hrs then cooled to room temperature over a period of 4 hrs. The product was removed from the tube and ground with a mortar and pestle. The samples were tested for photostimulated luminescence as described above. The photostimulated luminescent responses are listed in Table 5. Example 6e, $Cs_3ZnCl_5$, was normalized to a value of 100.

TABLE 5

$Cs_3ZnBr_{5-z}Cl_z$

| Ex | z | CsCl (g) | CsBr (g) | $ZnCl_2$ (g) | $ZnBr_2$ (g) | PSL (1) |
|---|---|---|---|---|---|---|
| 6a | 0.00 | — | 4.7882 | — | 1.6889 | 108087 |
| 6b | 1.25 | 1.5784 | 2.7931 | — | 1.6889 | 111638 |
| 6c | 2.50 | 3.1568 | .7980 | — | 1.6889 | 578265 |
| 6d | 3.75 | 2.2097 | 1.9951 | 1.0221 | — | 64 |
| 6e | 5.00 | 3.7881 | — | 1.0221 | — | 100 |

EXAMPLES 7a–7d $Cs_3ZnCl_5$:Eu

The samples were prepared as described in Example 4. The amounts of materials used and nominal composition of the final compound are listed in Table 6. The stoichiometry of the compounds was calculated assuming that $Eu^{2+}$ substituted for $Zn^{2+}$. Example 7d was prepared as in example 7a–7c except that $EuBr_2$ was used instead of $EuCl_3$ and the sample was heated as described in example 3b using two furnace translation cycles instead of one.

X-ray powder diffraction showed that examples 7a and 7b crystallized with the $Cs_3CoCl_5$ structure. Example 7c gave a pattern which indicated that the basic $Cs_3CoCl_5$ structure was intact but distorted. The PSL response of the samples is given in Table 6 and is relative to Example 4. The stimulation spectrum of $Cs_3ZnCl_5$:Eu was measured in the wavelength region from 500 nm to 1000 nm. The stimulation spectrum in this wavelength region consists of a single peak centered at 610 nm with a full width at half maximum of less than 200 nm. The photostimulated emission spectrum of $Cs_3ZnCl_5$:Eu was measured using 650 nm stimulation. The photostimulated emission spectrum in the wavelength region from 200 nm to 700 nm consists of a single emission band centered around 450 nm with a full width at half maximum of less than 100 nm. The measured lifetime of the $Eu^{2+}$ emission in Example 7d was about 850 nsec. It was determined that the stimulation spectrum, the photostimulated emission spectrum, and the lifetime of the $Eu^{2+}$ photostimulated emission does not change substantially when the concentration of europium changes in the phosphor.

TABLE 6

$Cs_3ZnCl_5$: jEu

| Ex | j | CsCl (g) | $ZnCl_2$ (g) | $EuCl_3$ (g) | PSL (1) |
|---|---|---|---|---|---|
| 7a | .0050 | 3.7881 | 1.0170 | .0097 | 818182 |
| 7b | .0250 | 3.7881 | .9966 | .0484 | 1347526 |
| 7c | 0.15 | 3.7881 | .8688 | .2906 | 476 |
| 7d | 0.001 | 7.5761 | 2.0443 | .0048 | — |

EXAMPLES 8a–8d $Cs_3ZnBr_5$:Eu

The samples were prepared substantially according to the method described in Example 5. The amounts of materials used and nominal compositions of the final compounds are listed in Table. The stoichiometry of the compounds was calculated assuming that $Eu^{2+}$ substitutes for $Zn^{2+}$. Example 8d was prepared substantially according to the method described in example 7d.

Examples 8a–8c were examined using x-ray powder diffraction. All samples crystallized with the $Cs_3ZnBr_5$ structure. The PSL response of the samples is given in Table 7 and is relative to Example 5. The stimulation spectrum of $Cs_3ZnBr_5$:Eu in the wavelength region from 500 nm to 1000 nm consists of a single peak centered around 690 nm with a full width at half maximum of less than 200 nm. The photostimulated emission spectrum of $Cs_3ZnBr_5$:Eu was measured using 650 nm stimulation. The photostimulated emission spectrum in the wavelength region from 200 nm to 700 nm consists of a single emission band centered around 450 nm with a full width at half maximum of less than 100 nm. The measured lifetime of the $Eu^{2+}$ emission in Example 8d was about 720 nsec. It was determined that the stimulation spectrum, the photostimulated emission spectrum, and the lifetime of the $Eu^{2+}$ photostimulated emission does not change substantially when the concentration of europium changes in the phosphor.

TABLE 7

$Cs_3ZnBr_5$: jEu

| Ex | j | CsBr (g) | $ZnBr_2$ (g) | $EuBr_2$ (g) | PSL (2) |
|---|---|---|---|---|---|
| 8a | .005 | 4.7882 | 1.6805 | .0117 | 207139 |
| 8b | .025 | 4.7882 | 1.6467 | .0585 | 364153 |
| 8c | .15 | 4.7882 | 1.4356 | .3508 | 16 |
| 8d | .0014 | 6.3843 | 2.2519 | .0043 | — |

EXAMPLES 9a–9q $Cs_3ZnBr_{5-z}Cl_z$:Eu

The samples were prepared substantially according to the method described in Examples 6a–6e. The amounts of materials used and nominal compositions of the final compounds are listed in Table 8. The $Eu^{2+}$ concentration was 0.5 mole %. The stoichiometry of the compounds was calculated assuming that $Eu^{2+}$ substitutes for $Zn^{2+}$. The photostimulated luminescent response of Examples 9a–9q are listed in Table 8 and are relative to Example 6e. The stimulation and stimulated emission spectrum of Examples 9g and 9o are shown in FIGS. 7 and 8. The measured lifetimes of the stimulated emission from $Eu^{2+}$ in Examples 9g and 9o were about 640 nsec and about 760 nsec, respectively.

TABLE 8

$Cs_3ZnBr_{5-z}Cl_z$: Eu

| Ex. | CsCl (g) | CsBr (g) | $ZnCl_2$ (g) | $ZnBr_2$ (g) | $EuBr_2$ (g) | EuCl2 |
|---|---|---|---|---|---|---|
| 9a | — | 4.7882 | — | 1.6805 | .0117 | — |
| 9b | .0316 | 4.7483 | — | 1.6805 | .0117 | — |
| 9c | .0631 | 4.7084 | — | 1.6805 | .0117 | — |
| 9d | .1263 | 4.6286 | — | 1.6805 | .0117 | — |
| 9e | .1894 | 4.5488 | — | 1.6805 | .0117 | — |
| 9f | .2525 | 4.4690 | — | 1.6805 | .0117 | — |
| 9g | .3157 | 4.3892 | — | 1.6805 | .0117 | — |
| 9h | .3788 | 4.3094 | — | 1.6805 | .0117 | — |
| 9i | .4419 | 4.2296 | — | 1.6805 | .0117 | — |
| 9j | .6314 | 3.9902 | — | 1.6805 | .0117 | — |
| 9k | 3.1568 | .7980 | — | 1.6805 | .0117 | — |
| 9l | 2.8411 | 1.1971 | 1.0170 | — | — | .0097 |
| 9m | 3.1568 | .7980 | 1.0170 | — | — | .0097 |
| 9n | 3.342 | .5586 | 1.0170 | — | — | .0097 |
| 9o | 3.4724 | .3990 | 1.0170 | — | — | .0097 |

TABLE 8-continued

Cs₃ZnBr$_x$Cl$_y$:Eu

| Ex. | CsCl (g) | CsBr (g) | ZnCl₂ (g) | ZnBr₂ (g) | EuBr₂ (g) | EuCl2 |
|---|---|---|---|---|---|---|
| 9p | 3.6618 | .1596 | 1.0170 | — | — | .0097 |
| 9q | 3.7881 | — | 1.0170 | — | — | .0097 |

EXAMPLES 10a–10d $Cs_{3-a}Li_aZnCl_5$

The samples were prepared substantially according to the method described in Example 4. The amounts of materials used and nominal composition of the final compounds are listed in Table 9. X-ray powder diffraction showed that Examples 10a and 10b crystallized in the same structure type as $Cs_3ZnCl_5$. Examples 10c and 10d crystallized in a completely different structure type from $Cs_3ZnCl_5$. The structure type was not identified. The PSL of the samples relative to Example 4 is listed in Table 9. The materials of Examples 10c (25 mole percent Li) and 10d (50 mole percent Li) were strongly hygroscopic and PSL measurements could not be obtained.

TABLE 9

$Cs_{3-a}Li_aZnCl_5$

| Ex | a | Li (mol %) | CsCl (g) | ZnCl₂ (g) | LiCl (g) | PSL (1) |
|---|---|---|---|---|---|---|
| 10a | .15 | 5 | 3.5987 | 1.0221 | .0477 | .78 |
| 10b | .3 | 10 | 3.4093 | 1.0221 | .0954 | .78 |
| 10c | .75 | 25 | 2.8410 | 1.0221 | .2385 | — |
| 10d | 1.50 | 50 | 1.8940 | 1.0221 | .4769 | — |

EXAMPLE 11

$Cs_{3-a}Li_aZnCl_5:0.005Eu$

The sample was prepared substantially according to the method described in Example 4. The amounts of materials used and nominal composition of the final compound are listed in Table 10. The stoichiometry of the compounds was calculated assuming that $Eu^{2+}$ substitutes for $Zn^{2+}$ in $Cs_{3-a}Li_aZnCl_5$. The PSL is relative to Example 4.

TABLE 10

$Cs_{3-a}Li_aZnCl_5:0.005\ Eu$

| Ex | a | Li (mol %) | CsCl (g) | ZnCl₂ (g) | LiCl (g) | EuCl₃ (g) | PSL (1) |
|---|---|---|---|---|---|---|---|
| 11 | .15 | 5 | 3.5987 | 1.0170 | .0477 | .0097 | 36248 |

EXAMPLES 12a–12d $Cs_{3-a}Li_aZnBr_5$

The samples were prepared substantially according to the method described in Example 5. The amounts of materials used and nominal compositions of the final compounds are listed in Table 11. X-ray powder diffraction was conducted. Examples 12a and 12b were isostructural with $Cs_3ZnBr_5$. Example 12c showed two distinct phases and Example 12d crystallized in a different structure type from $Cs_3ZnBr_5$. The structure type was not identified. The PSL of the samples, relative to Example 5, is listed in Table 11. The materials of Examples 12c (25 mole percent Li) and 12d (50 mole percent Li) were strongly hygroscopic and PSL measurements could not be obtained.

TABLE 11

$Cs_{3-a}Li_aZnBr_5$

| Ex | a | Li (mol %) | CsBr (g) | ZnBr₂ (g) | LiBr (g) | PSL (2) |
|---|---|---|---|---|---|---|
| 12a | .15 | 5 | 4.5488 | 1.6889 | .0977 | 33 |
| 12b | .3 | 10 | 4.3094 | 1.6889 | .1954 | .1 |
| 12c | .75 | 25 | 3.5912 | 1.6889 | .4885 | — |
| 12d | 1.50 | 50 | 2.3941 | 1.6889 | .9770 | — |

EXAMPLE 13

$Cs_{3-a}Li_aZnBr_5:0.005Eu$

The sample was prepared substantially according to the method described in Example 5. The amounts of materials used and nominal composition of the final compound are listed in Table 12. The stoichiometry of the compound was calculated assuming that $Eu^{2+}$ substitutes for $Zn^{2+}$ in $Cs_{3-a}Li_aZnBr_5$. The PSL of Example 13 is relative to Example 5.

TABLE 12

$Cs_{3-a}Li_aZnBr_5: 0.005\ Eu$

| Ex | a | Li (mol %) | CsBr (g) | ZnBr₂ (g) | LiBr (g) | EuBr₂ (g) | PSL (2) |
|---|---|---|---|---|---|---|---|
| 13 | .15 | 5 | 4.5488 | 1.6805 | .0977 | .0117 | 109682 |

EXAMPLES 14a–14b $Cs_{3-a}Li_aZnBr_{5-z}Cl_z$

The samples were prepared substantially according to the method described in Examples 6. The amounts of materials used and nominal compositions of the final compounds are listed in Table 13. X-ray powder diffraction showed that Examples 14a and 14b both crystallized in the same structure type as $Cs_3ZnBr_{5-z}Cl_z$. The PSL of the samples relative to Example 6e is listed in Table 13. The material of Example 14b was strongly hygroscopic.

TABLE 13

$Cs_{3-a}Li_aZnBr_{5-z}Cl_z\ (a = 0.15)$

| Ex | z | CsBr (g) | CsCl (g) | ZnBr₂ (g) | ZnCl₂ (g) | LiCl (g) | LiBr (g) | PSL (1) |
|---|---|---|---|---|---|---|---|---|
| 14a | .25 | 4.1498 | .3157 | 1.6889 | — | — | .0977 | 854 |
| 14b | 4.75 | .3990 | 3.2830 | — | 1.0221 | .0477 | — | 0 |

EXAMPLES 15a–15b $Cs_{3-a}Li_aZnBr_{5-z}Cl_z$:Eu

The samples were prepared substantially according to the method described in Example 6. The amounts of materials used are listed in Table 14. Stoichiometry was calculated assuming that $Eu^{2+}$ substitutes for $Zn^{2+}$ in $Cs_{3-a}Li_aZnBr_{5-z}Cl_z$. The PSL responses of Examples 15a–15b relative to the PSL of Example 6e, are listed in Table 14.

TABLE 14

$Cs_{3-a}Li_aZnBr_{5-z}Cl_z$: 0.01 Eu (a = 0.15)

| Ex | CsBr (g) | CsCl (g) | ZnBr$_2$ (g) | ZnCl$_2$ (g) | LiCl (g) | LiBr (g) | EuBr$_2$ (g) | EuCl$_3$ (g) | z | PSL (1) |
|---|---|---|---|---|---|---|---|---|---|---|
| 15a | 4.1498 | .3157 | .6720 | — | — | .0977 | .0234 | — | .25 | 1080097 |
| 15b | .3990 | 3.2830 | — | 1.0119 | .0477 | — | — | .0194 | 4.75 | 138 |

EXAMPLES 16a–16d: $Cs_{3-b}Na_bZnCl_5$

The samples were prepared substantially according to the method described in Example 4. The amounts of materials used and nominal composition of the final compounds are listed in Table 15. Examples 16a–16d were examined by x-ray powder diffraction. Examples 16a and 16b crystallized with the $Cs_3ZnCl_5$ structure type. Example 16c showed a phase which was isostructural with $Cs_3ZnCl_5$ and an additional unidentified phase. Example 16d crystallized in a completely different structure type from $Cs_3ZnCl_5$. The structure type was not identified. The PSL of the samples relative to Example 4 is listed in Table 15.

TABLE 15

$Cs_{3-b}Na_bZnCl_5$

| Ex | b | Na (mol %) | CsCl (g) | ZnCl$_2$ (g) | NaCl (g) | PSL (1) |
|---|---|---|---|---|---|---|
| 16a | .15 | 5 | 3.5987 | 1.0221 | .0657 | .97 |
| 16b | .3 | 10 | 3.4093 | 1.0221 | .1315 | .97 |
| 16c | .75 | 25 | 2.8410 | 1.0221 | .3287 | .97 |
| 16d | 1.50 | 50 | 1.8940 | 1.0221 | .6575 | 4.87 |

EXAMPLE 17

$Cs_{3-b}Na_bZnCl_5$:Eu

The sample was prepared substantially according to the method described in Example A2. The amounts of materials used and nominal composition of the final compound are listed in Table 16. Stoichiometry was calculated assuming that $Eu^{2+}$ substitutes for $Zn^{2+}$ in $Cs_{3-b}Na_bZnCl_5$. The PSL response of Example 17 is relative to Example 4. This demonstrates that enhanced stimulated emission is observed with an activator cation like $Eu^{2+}$ in $Cs_{3-b}Na_bZnCl_5$.

TABLE 16

$Cs_{3-b}Na_bZnCl_5$: 0.005 Eu

| Ex | b | Na (mol %) | CsCl (g) | ZnCl$_2$ (g) | NaCl (g) | EuCl$_3$ (g) | PSL (1) |
|---|---|---|---|---|---|---|---|
| 17 | .15 | 5 | 3.5987 | 1.0170 | .0657 | .0097 | 11507 |

EXAMPLES 18a–18d $Cs_{3-b}Na_bZnBr_5$

The samples were prepared substantially according to the method described in Example 5. The amounts of materials used and nominal compositions of the final compounds are listed in Table 17. X-ray powder diffraction showed that the major phase in Example 18a was isostructural with $Cs_3ZnBr_5$. Examples 18b and 18c crystallized in a distorted $Cs_3ZnBr_5$ lattice as shown by the splitting of various lines in the x-ray diffraction pattern. Example 18d crystallized in a different structure type from $Cs_3ZnBr_5$. The structure type was not identified. The PSL of the samples relative to Example 5 is listed in Table 17.

TABLE 17

$Cs_{3-b}Na_bZnBr_5$

| Ex | b | Na (mol %) | CsBr (g) | ZnBr$_2$ (g) | NaBr (g) | PSL (2) |
|---|---|---|---|---|---|---|
| 18a | .15 | 5 | 4.5488 | 1.6889 | .1158 | 107 |
| 18b | .3 | 10 | 4.3094 | 1.6889 | .2315 | 8072 |
| 18c | .75 | 25 | 3.5912 | 1.6889 | .5788 | 103 |
| 18d | 1.50 | 50 | 2.3941 | 1.6889 | 1.1576 | 45 |

EXAMPLE 19

$Cs_{3-b}Na_bZnBr_5$:Eu

The sample was prepared substantially according to the method described in Example 5. The amounts of materials used and nominal composition of the final compound are listed in Table 18. Stoichiometry was calculated assuming that $Eu^{2+}$ substitutes for $Zn^{2+}$ in $Cs_{3-b}Na_bZnBr_5$. The PSL response of Example 19 was relative to Example 5.

TABLE 18

$Cs_{3-b}Na_bZnBr_5$: 0.005 Eu

| Ex | b | Na (mol %) | CsBr (g) | ZnBr$_2$ (g) | NaBr (g) | EuBr$_2$ (g) | PSL (2) |
|---|---|---|---|---|---|---|---|
| 19 | .15 | 5 | 4.5488 | 1.6805 | .1158 | .0117 | 35800 |

EXAMPLES 20a–20b $Cs_{3-b}Na_bZnBr_{5-z}Cl_z$

The samples were prepared substantially according to the method described in Examples 6. The amounts of materials used and nominal compositions of the final compounds are listed in Table 19. X-ray powder diffraction was performed. Examples 20a and 20b crystallized in the same structure type as $Cs_3ZnBr_{5-z}Cl_z$. The PSL of the samples is relative to Example 6e.

TABLE 19

$Cs_{3-b}Na_bZnBr_{4-z}Cl_z$ (b = 0.15)

| Ex | z | CsBr (g) | CsCl (g) | $ZnBr_2$ (g) | $ZnCl_2$ (g) | NaCl (g) | NaBr (g) | PSL (1) |
|---|---|---|---|---|---|---|---|---|
| 20a | .25 | 4.1498 | .3157 | 1.6889 | — | — | .1158 | 377 |
| 20b | 4.75 | .3990 | 3.2830 | — | 1.0221 | .0657 | — | 91 |

EXAMPLES 21a–21b $Cs_{3-b}Na_bZnBr_{5-z}Cl_z$:Eu

The samples were prepared substantially according to the method described in Examples 6. The amounts of materials used and nominal compositions of the final compounds are listed in Table 20. The stoichiometry of the compounds was calculated assuming that $Eu^{2+}$ substitutes for $Zn^{2+}$ in $Cs_{3-b}Na_bZnBr_{5-z}Cl_z$. The PSL of Examples 21a and 21b are relative to Example 6e.

TABLE 20

$Cs_{3-b}Na_bZnBr_{4-z}Cl_z$: 0.01 Eu (b = 0.15)

| Ex | CsBr (g) | CsCl (g) | $ZnBr_2$ (g) | $ZnCl_2$ (g) | NaCl (g) | NaBr (g) | $EuBr_2$ (g) | $EuCl_3$ (g) | z | PSL (1) |
|---|---|---|---|---|---|---|---|---|---|---|
| 21a | 4.1498 | .3157 | 1.6720 | — | — | .1158 | .0234 | — | .25 | 1056163 |
| 21b | .3990 | 3.2830 | — | 1.0119 | .0657 | — | — | .0194 | 4.75 | 664 |

EXAMPLES 22a–22d $Cs_{3-c}K_cZnCl_5$

The samples were prepared substantially according to the method described in Example 4. The amounts of materials used and nominal compositions of the final compounds are listed in Table 21. Examples 22a–22d were examined by x-ray powder diffraction. Example 22a showed the $Cs_3ZnCl_5$ structure. The x-ray powder diffraction patterns of examples 22b and 22c showed split lines which can tentatively be explained as a distorted $Cs_3ZnCl_5$ lattice type. Example 22d crystallized in a completely different structure type from $Cs_3ZnCl_5$. The structure type was not identified. The PSL of the samples relative to Example 4 is listed in Table 21.

TABLE 21

$Cs_{3-c}K_cZnCl_5$

| Ex | c | K (mol %) | CsCl (g) | $ZnCl_2$ (g) | KCl (g) | PSL (1) |
|---|---|---|---|---|---|---|
| 22a | .15 | 5 | 3.5987 | 1.0221 | .0839 | 14 |
| 22b | .3 | 10 | 3.4093 | 1.0221 | .1677 | 10 |
| 22c | .75 | 25 | 2.8410 | 1.0221 | .4194 | 11 |
| 22d | 1.50 | 50 | 1.8940 | 1.0221 | .8387 | 20 |

EXAMPLE 23

$Cs_{3-c}K_cZnCl_5$:Eu

The sample was prepared substantially according to the method described in Example 4. The amounts of materials used and nominal composition of the final compound are listed in Table 22. Stoichiometry was calculated assuming that $Eu^{2+}$ substitutes for $Zn^{2+}$ in $Cs_{3-c}K_cZnCl_5$. The PSL response of Example 23 is relative to Example 4. This demonstrates that enhanced stimulated emission is observed with an activator cation like $Eu^{2+}$ in $Cs_{3-c}K_cZnCl_5$.

TABLE 22

$Cs_{3-c}K_cZnCl_5$: 0.005 Eu

| Ex | c | K (mol %) | CsCl (g) | $ZnCl_2$ (g) | KCl (g) | $EuCl_3$ (g) | PSL (1) |
|---|---|---|---|---|---|---|---|
| 23 | .15 | 5 | 3.5987 | 1.0170 | .0839 | .0097 | 72497 |

EXAMPLES 24a–24d $Cs_{3-c}K_cZnBr_5$

The samples were prepared substantially according to the method described in Example 5. The amounts of materials used and nominal compositions of the final compounds are listed in Table 23. Examples 24a–24d were examined using x-ray powder diffraction. Examples 24a and 24b were isostructural with $Cs_3ZnBr_5$. Example 24c showed two distinct phases and Example 24d crystallized in a different structure type from $Cs_3ZnBr_5$. The structure type was not identified. The PSL of the samples relative to Example 5 is listed in Table 23.

TABLE 23

$Cs_{3-c}K_cZnBr_5$

| Ex | c | K (mol %) | CsBr (g) | $ZnBr_2$ (g) | KBr (g) | PSL (2) |
|---|---|---|---|---|---|---|
| 24a | .15 | 5 | 4.5488 | 1.6889 | .1861 | 4485 |
| 24b | .30 | 10 | 4.3094 | 1.6889 | .3721 | 1922 |
| 24c | .75 | 25 | 3.5912 | 1.6889 | .9303 | 1922 |
| 24d | 1.50 | 50 | 2.3941 | 1.6889 | 1.8605 | 78 |

EXAMPLE 25

$Cs_{3-c}K_cZnBr_5$:Eu

The sample was prepared substantially according to the method described in Example 5. The amounts of materials used and nominal composition of the final compound are listed in Table 24. Stoichiometry was calculated assuming that $Eu^{2+}$ substitutes for $Zn^{2+}$ in $Cs_{3-c}K_cZnBr_5$. The PSL response of Example 25 is relative to Example 5.

TABLE 24

$Cs_{3-c}K_cZnBr_5: 0.005\ Eu$

| Ex | c | Na (mol %) | CsBr (g) | ZnBr₂ (g) | KBr (g) | EuBr₂ (g) | PSL (2) |
|---|---|---|---|---|---|---|---|
| 25 | .15 | 5 | 4.5488 | 1.6805 | .1861 | .0117 | 89309 |

EXAMPLES 26a–26b $Cs_{3-c}K_cZnBr_{5-z}Cl_z$

The samples were prepared substantially according to the method described in Examples 6. The amounts of materials used and nominal compositions of the final compounds are listed in Table 25. Examples 26a and 26b crystallized in the same structure type as $Cs_3ZnBr_{5-z}Cl_z$. The PSL of the samples relative to Example 6e, is listed in Table 25.

TABLE 25

$Cs_{3-c}K_cZnBr_{5-z}Cl_z\ (c = 0.15)$

| Ex | z | CsBr (g) | CsCl (g) | ZnBr₂ (g) | ZnCl₂ (g) | KCl (g) | KBr (g) | PSL (1) |
|---|---|---|---|---|---|---|---|---|
| 26a | .25 | 4.1498 | .3157 | 1.6889 | — | — | .1339 | 33661 |
| 26b | 4.75 | .3990 | 3.2830 | — | 1.0221 | .0839 | — | 39 |

EXAMPLES 27a–27b $Cs_{3-c}K_cZnBr_{5-z}Cl_z:Eu$

The samples were prepared substantially according to the method described in Examples 6. The amounts of materials used and nominal compositions of the final compounds are listed in Table 26. The stoichiometry of the compounds was calculated assuming that $Eu^{2+}$ substitutes for $Zn^{2+}$ in $Cs_{3-c}K_cZnBr_{5-z}Cl_z$. The PSL of Examples 27a and 27b relative to Example 6e, are shown in Table 26.

TABLE 26

$Cs_{3-c}K_cZnBr_{5-z}Cl_z: 0.01\ Eu\ (c = 0.15)$

| Ex | CsBr (g) | CsCl (g) | ZnBr₂ (g) | ZnCl₂ (g) | KCl (g) | KBr (g) | EuBr₂ (g) | EuCl₃ (g) | z | PSL (1) |
|---|---|---|---|---|---|---|---|---|---|---|
| 27a | 4.1498 | .3157 | 1.6720 | — | — | .1339 | .0234 | — | .25 | 104227 |
| 27b | .3990 | 3.2830 | — | 1.0119 | .0839 | — | — | .0194 | 4.75 | 63694 |

EXAMPLES 28a–28d $(Cs_{1-r}Rb_r)_3ZnCl_5$

The samples were prepared substantially according to the method described in Example 4. The amounts of materials used and nominal compositions of the final compounds are listed in Table 27. X-ray powder diffraction showed that Examples 28a–28d all crystallized in the same structure type as $Cs_3ZnCl_5$. DTA of $Rb_3ZnCl_5$ showed that the compound melted at 500°±5° C. The PSL of the samples relative to Example 4, is listed in Table 27.

TABLE 27

$(Cs_{1-r}Rb_r)_3ZnCl_5$

| Ex | r | CsCl (g) | ZnCl₂ (g) | RbCl (g) | PSL (1) |
|---|---|---|---|---|---|
| 28a | .25 | 2.8410 | 1.0221 | .6802 | 66 |
| 28b | .50 | 1.8940 | 1.0221 | 1.3604 | 88 |
| 28c | .75 | 0.9470 | 1.0221 | 2.0406 | 47 |
| 28d | 1.00 | 0.0000 | 1.0221 | 2.7208 | 70 |

EXAMPLES 29a–29d $(Cs_{1-r}Rb_r)_3ZnCl_5:0.005Eu$

The samples were prepared substantially according to the method described in Example 4. The amounts of materials used and nominal compositions of the final compounds are listed in Table 28. The stoichiometry of the compounds was calculated assuming that $Eu^{2+}$ substitutes for $Zn^{2+}$ in $(Cs_{1-r}Rb_r)_3ZnCl_5$. X-ray powder diffraction showed that Examples 29a–29d crystallized in the $Cs_3ZnCl_5$ structure. The PSL of the samples, relative to Example 4, is listed in Table 28.

TABLE 28

$(Cs_{1-r}Rb_r)_3ZnCl_5: 0.005\ Eu$

| Ex | r | CsCl (g) | ZnCl₂ (g) | RbCl (g) | EuCl₃ (g) | PSL (1) |
|---|---|---|---|---|---|---|
| 29a | .25 | 2.8410 | 1.0170 | .6802 | .0097 | 5020 |
| 29b | .50 | 1.8940 | 1.0170 | 1.3604 | .0097 | 7624 |
| 29c | .75 | 0.9470 | 1.0170 | 2.0406 | .0097 | 13234 |
| 29d | 1.00 | 0.0000 | 1.0170 | 2.7208 | .0097 | 151273 |

EXAMPLES 30a–30d $(Cs_{1-r}Rb_r)_3ZnBr_5$

The samples were prepared substantially according to the method described in Example 5. The amounts of materials used and nominal compositions of the final compounds are listed in Table 29. X-ray powder diffraction was conducted.

Examples 30a–30c had a major phase crystallizing in the same structure type as $Cs_3ZnBr_5$. Example 30d crystallized in a different structure. Examination of Example 30d using polarizarized optical microscopy showed that the major phase was uniaxial, indicating that the Bravais symmetry is either tetragonal or hexagonal. DTA examination of $Rb_3ZnBr_5$ showed that the melting point of the compound was 450°±5° C. The melting point of RbBr is 698° C. and the melting point of $ZnBr_2$ is 394° C. The difference in melting points showed that the $Rb_3ZnBr_5$ was not an unreacted mixture of the starting materials. The PSL of the samples, relative to Example 5, is listed in Table 29.

TABLE 29

$(Cs_{1-r}Rb_r)_3ZnBr_5$

| Ex | r | CsBr (g) | ZnBr₂ (g) | RbBr (g) | PSL (2) |
|---|---|---|---|---|---|
| 30a | .25 | 3.5912 | 1.6889 | .9303 | 72 |
| 30b | .50 | 2.3941 | 1.6889 | 1.8605 | 19 |
| 30c | .75 | 1.1971 | 1.6889 | 2.7908 | 28 |
| 30d | 1.00 | 0.0000 | 1.6889 | 3.7210 | 228 |

EXAMPLE 31a–31f $(Cs_{1-r}Rb_r)_3ZnBr_5$:0.005Eu

The samples were prepared substantially according to the method described in Example 5. The amounts of materials used and nominal compositions of the final compounds are listed in Table 30. The stoichiometry of the compounds was calculated assuming that $Eu^{2+}$ substitutes for $Zn^{2+}$ in $(Cs_{1-r}Rb_r)_3ZnBr_5$. X-ray powder diffraction showed that Examples 31a–31c crystallized in the $Cs_3ZnBr_5$ structure. Examples 31d and 31e showed a phase which was isostructural with $Cs_3ZnBr_5$ plus an additional phase which was not identified. Example 31f crystallized with a different structure type, that appeared to be the same as that of Example 30d. The PSL of the samples, relative to Example 5, is listed in Table 30.

TABLE 30

$(Cs_{1-r}Rb_r)_3ZnBr_5$: 0.005 Eu

| Ex | r | CsBr (g) | ZnBr₂ (g) | RbBr (g) | EuBr₂ (g) | PSL (2) |
|---|---|---|---|---|---|---|
| 31a | .05 | 1.5488 | 1.6805 | .1861 | .0117 | 84235 |
| 31b | .10 | 4.3094 | 1.6805 | .3721 | .0117 | 67013 |
| 31c | .25 | 3.5912 | 1.6805 | .9303 | .0117 | 52714 |
| 31d | .50 | 2.3941 | 1.6805 | 1.8605 | .0117 | 2 |
| 31e | .75 | 1.1971 | 1.6805 | 2.7908 | .0117 | 1 |
| 31f | 1.00 | 0.0000 | 1.6805 | 3.7210 | .0117 | 60684 |

EXAMPLE 32a–32b $(Cs_{1-r}Rb_r)_3ZnBr_{5-z}Cl_z$

The samples were prepared substantially according to the method described in Examples 6. The amounts of materials used and nominal compositions of the final compounds are listed in Table 31. X-ray powder diffraction was conducted. Examples 32a and 32b crystallized in the same structure type as $Cs_3ZnBr_{5-z}Cl_z$. The PSL of the samples, relative to Example 6e, is listed in Table 31.

TABLE 31

$(Cs_{1-r}Rb_r)_3ZnBr_{5-z}Cl_z$ (r = 0.05)

| Ex | z | CsBr (g) | CsCl (g) | ZnBr₂ (g) | ZnCl₂ (g) | RbCl (g) | RbBr (g) | PSL (1) |
|---|---|---|---|---|---|---|---|---|
| 32a | .25 | 4.1498 | .3157 | 1.6889 | — | — | .1861 | 190 |
| 32b | 4.75 | .3990 | 3.2830 | — | 1.0221 | .1360 | — | 93 |

EXAMPLES 33a–33b $(Cs_{1-r}Rb_r)_3ZnBr_{5-z}Cl_z$:Eu

The samples were prepared substantially according to the method described in Examples 6. The amounts of materials used and nominal compositions of the final compounds are listed in Table 32. The stoichiometry of the compounds was calculated assuming that $Eu^{2+}$ substitutes for $Zn^{2+}$ in $(Cs_{1-r}Rb_r)_3ZnBr_{5-z}Cl_z$. X-ray powder diffraction showed that Examples 33a and 33b crystallized in the $Cs_3ZnCl_5$ structure. The PSL of the samples, relative to Example 6e, is listed in Table 32.

TABLE 32

$(Cs_{1-r}Rb_r)_3ZnBr_{5-z}Cl_z$: 0.01 Eu (r = 0.05)

| Ex | CsBr (g) | CsCl (g) | ZnBr₂ (g) | ZnCl₂ (g) | RbCl (g) | RbBr (g) | EuBr₂ (g) | EuCl₃ (g) | z | PSL (1) |
|---|---|---|---|---|---|---|---|---|---|---|
| 33a | 4.1498 | .3157 | 1.6720 | — | — | .1861 | .0234 | — | .25 | 373672 |
| 33b | .3990 | 3.2830 | — | 1.0119 | .1360 | — | — | .0194 | 4.75 | 164060 |

EXAMPLE 34

$(Cs_{1-r}Rb_r)_{3-n}(Li_aNa_bK_c)ZnCl_5$ where $n=(a+b+c)$

The sample was prepared substantially according to the method described in Example 4. The amounts of materials used and nominal composition of the final compound are listed in Table 33. X-ray powder diffraction showed that Example 34 crystallized in the same structure type as $Cs_3ZnCl_5$. The PSL of the Example 34 is relative to Example 4.

TABLE 33

$(Cs_{1-r}Rb_r)_{3-n}(Li_aNa_bK_c)ZnCl_5$ where $n = (a + b + c) = 0.0045$, $r = 0.0005, a = 0.0015, b = 0.0015, c = 0.0015$

| Ex | CsCl (g) | ZnCl$_2$ (g) | RbCl (g) | KCl (g) | NaCl (g) | LiCl (g) | PSL (1) |
|---|---|---|---|---|---|---|---|
| 34 | 3.7805 | 1.0221 | .0014 | .0008 | .0007 | .0005 | 2970 |

EXAMPLE 35

$(Cs_{1-r}Rb_r)_{3-n}(Li_aNa_bK_c)ZnCl_5$:Eu where $n=(a+b+c)$

The sample was prepared substantially according to the method described in Example 4. The amounts of materials used and nominal composition of the final compound are listed in Table 34. The stoichiometry of the compounds was calculated assuming that $Eu^{2+}$ substitutes for $Zn^{2+}$ in the compounds. The PSL of Example 35 is relative to Example 4.

TABLE 34

$(Cs_{1-r}Rb_r)_{3-n}(Li_aNa_bK_c)ZnCl_5$: 0.005 Eu where $n = (a + b + c) = 0.0045$, $r = 0.0005, a = 0.0015, b = 0.0015, c = 0.0015$

| Ex | CsCl (g) | ZnCl$_2$ (g) | RbCl (g) | KCl (g) | NaCl (g) | LiCl (g) | EuCl$_3$ (g) | PSL (1) |
|---|---|---|---|---|---|---|---|---|
| 35 | 3.7805 | 1.0170 | .0014 | .0008 | .0007 | .0005 | .0097 | 367434 |

EXAMPLE 36

$(Cs_{1-r}Rb_r)_{3-n}(Li_aNa_bK_c)ZnBr_5$ where $n=(a+b+c)$

The sample was prepared substantially according to the method described in Example 5. The amounts of materials used and nominal composition of the final compound are listed in Table 35. X-ray powder diffraction showed that Example 36 crystallized in the same structure type as $Cs_3ZnBr_5$. The PSL of the Example 36 is relative to Example 5.

TABLE 35

$(Cs_{1-r}Rb_r)_{3-n}(Li_aNa_bK_c)ZnBr_5$ where $n = (a + b + c) = 0.0045$, $r = 0.0005, a = 0.0015, b = 0.0015, c = 0.0015$

| Ex | CsBr (g) | ZnBr$_2$ (g) | RbBr (g) | KBr (g) | NaBr (g) | LiBr (g) | PSL (2) |
|---|---|---|---|---|---|---|---|
| 36 | 4.7858 | 1.6889 | .0019 | .0013 | .0012 | .0010 | 1845 |

EXAMPLE 37

$(Cs_{1-r}Rb_r)_{3-n}(Li_aNa_bK_c)ZnBr_5$:Eu where $n=(a+b+c)$

The sample was prepared substantially according to the method described in Example 5. The amounts of materials used and nominal composition of the final compound are listed in Table 36. The stoichiometry of the compounds was calculated assuming that $Eu^{2+}$ substitutes for $Zn^{2+}$ in the compounds. The PSL of Example 37 is relative to Example 5.

TABLE 36

$(Cs_{1-r}Rb_r)_{3-n}(Li_aNa_bK_c)ZnBr_5$: 0.005 Eu where $n = (a + b + c) = 0.0045$, $r = 0.0005, a = 0.0015, b = 0.0015, c = 0.0015$

| Ex | CsBr (g) | ZnBr$_2$ (g) | RbBr (g) | KBr (g) | NaBr (g) | LiBr (g) | EuBr$_2$ (g) | PSL (2) |
|---|---|---|---|---|---|---|---|---|
| 37 | 4.7858 | 1.6805 | .0019 | .0013 | .0012 | .0010 | .0117 | 141894 |

EXAMPLES 38a-38b $(Cs_{1-r}Rb_r)_{3-n}(Li_aNa_bK_c)ZnBr_{5-z}Cl_z$

The samples were prepared substantially according to the method described in Examples 6, except that the alkali metals other than Cs were added as mixtures which were prepared and dehydrated by heating under vacuum in advance. The amounts of alkali halides used to prepare the mixtures are shown in Table 37. The amounts of materials used and nominal compositions of the final compounds of Examples 38a-38b are listed in Table 38. X-ray powder diffraction examination of Examples 38a and 38b showed that both crystallized with the $Cs_3CoCl_5$ structure type. The PSL of Examples 38a and 38b are relative to Example 6e and are shown in Table 38.

TABLE 37

| Preparation of Anhydrous Alkali Halide Mixtures | | | | |
|---|---|---|---|---|
| Mixture 1 | LiBr (g) | NaBr (g) | KBr (g) | RbBr (g) |
| | .0977 | .1158 | .1339 | .1860 |
| Mixture 2 | LiCl (g) | NaCl (g) | KCl (g) | RbCl (g) |
| | .0477 | .0657 | .0839 | .1360 |

TABLE 38

$(Cs_{1-r}Rb_r)_{3-n}(Li_aNa_bK_c)ZnBr_{5-z}Cl_z$ where n = (a + b + c) = 0.0045, r = 0.0005, a = 0.0015, b = 0.0015, c = 0.0015

| Ex | z | CsBr (g) | CsCl (g) | ZnBr₂ (g) | ZnCl₂ (g) | Mixt. #1 (g) | Mixt. #2 (g) | PSL (1) |
|---|---|---|---|---|---|---|---|---|
| 38a | .25 | 4.3796 | .3157 | 1.6889 | — | .0053 | — | 1494224 |
| 38b | 4.75 | .3990 | 3.4648 | — | 1.0221 | — | .0033 | 632 |

EXAMPLES 39a-39b $(Cs_1-Rb_r)_{3-n}(Li_aNa_bK_c)ZnBr_{5-z}Cl_z$:Eu where n=(a+b+c)

The samples were prepared substantially according to the method described in Examples 38a-38b, except that Eu was added as $EuBr_2$ or $EuCl_3$. The amounts of materials used and nominal compositions of the final compounds are listed in Table 39. The stoichiometry of the compounds was calculated assuming that $Eu^{2+}$ substitutes for $Zn^{2+}$ in the compounds. The PSL of Examples 39a and 39b relative to Example 6e are shown in Table 39.

EXAMPLE 40a-40d $Cs_3(Zn_{1-m}Mg_m)Cl_5$

The samples were prepared substantially according to the method described in Example 4 except that the samples were heated at 775° C. The amounts of materials used and nominal compositions of the final compounds are listed in Table 40. X-ray powder diffraction was conducted. Examples 40a-40d all crystallized in the same structure type as $Cs_3ZnCl_5$. The PSL of the samples, relative to Example 4, is listed in Table 40.

TABLE 40

$Cs_3(Zn_{1-m}Mg_m)Cl_5$

| Ex | m | CsCl (g) | ZnCl₂ (g) | MgCl₂ (g) | PSL (1) |
|---|---|---|---|---|---|
| 40a | .05 | 3.7881 | 0.9710 | .0357 | 19908 |
| 40b | .10 | 3.7881 | 0.9199 | .0714 | 6329 |
| 40c | .25 | 3.7881 | 0.7666 | .1785 | 8861 |
| 40d | .50 | 3.7881 | 0.5111 | .3571 | 12 |

EXAMPLE 41

$Cs_3(Zn_{1-m}Mg_m)Cl_5$:0.01Eu

The sample was prepared substantially according to the method described in Example 40a. The amounts of materials used and nominal composition of the final compound are listed in Table 41. The stoichiometry of the compounds was calculated assuming that $Eu^{2+}$ substitutes for $Zn^{2+}$ in $Cs_3(Zn_{1-m}Mg_m)Cl_5$. The PSL response of Example 41 is relative to Example 4.

TABLE 39

$(Cs_{1-r}Rb_r)_{3-n}(Li_aNa_bK_c)ZnBr_{5-z}Cl_z$: 0.01 Eu where n = (a + b + c) = 0.0045, r = 0.0005, a = 0.0015, b = 0.0015, c = 0.0015

| Ex | CsBr (g) | CsCl (g) | ZnBr₂ (g) | ZnCl₂ (g) | Mixture #1 (g) | Mixture #2 (g) | EuBr₂ (g) | EuCl₃ (g) | z | PSL(1) |
|---|---|---|---|---|---|---|---|---|---|---|
| 39a | 4.3796 | .3157 | 1.6720 | — | .0053 | — | .0234 | — | .25 | 627676 |
| 39b | .3990 | 3.4648 | — | 1.0119 | — | .0033 | — | .0194 | 4.75 | 1173052 |

TABLE 41

| | $Cs_3(Zn_{1-m}Mg_m)Cl_5$: 0.01 Eu | | | | |
|---|---|---|---|---|---|
| Ex | m | CsCl (g) | $ZnCl_2$ (g) | $MgCl_2$ (g) | $EuCl_3$ (g) | PSL (1) |
| 41 | .05 | 3.7881 | 0.9608 | .0357 | .0194 | 625719 |

EXAMPLE 42a–42d $Cs_3(Zn_{1-m}Mg_m)Br_5$

The samples were prepared substantially according to the method described in Example 5. The amounts of materials used and nominal compositions of the final compounds are listed in Table 42. X-ray powder diffraction was conducted. Examples 42a–42d all crystallized in the same structure type as $Cs_3ZnBr_5$. The PSL of the samples, relative to Example 5, is listed in Table 42.

TABLE 42

| | $Cs_3(Zn_{1-m}Mg_m)Br_5$ | | | |
|---|---|---|---|---|
| Ex | m | CsBr (g) | $ZnBr_2$ (g) | $MgBr_2$ (g) | PSL (2) |
| 42a | .05 | 4.7884 | 1.6045 | .0690 | 12378 |
| 42b | .10 | 4.7884 | 1.5200 | .1381 | 113397 |
| 42c | .25 | 4.7884 | 1.2667 | .3452 | 16734 |
| 42d | .50 | 4.7884 | 0.8445 | .6905 | 6868 |

EXAMPLE 43

$Cs_3(Zn_{1-m}Mg_m)Br_5$:Eu

The sample was prepared substantially according to the method described in Example 5. The amounts of materials used and nominal composition of the final compound are listed in Table 43. The stoichiometry of the compounds was calculated assuming that $Eu^{2+}$ substitutes for $Zn^{2+}$ in $Cs_3(Zn_{1-m}Mg_m)Br_5$. The PSL response is relative to Example 5.

TABLE 43

| | $Cs_3(Zn_{1-m}Mg_m)Br_5$: 0.01 Eu | | | | |
|---|---|---|---|---|---|
| Ex | m | CsBr (g) | $ZnBr_2$ (g) | $MgBr_2$ (g) | $EuBr_2$ (g) | PSL (2) |
| 43 | .05 | 4.7884 | 1.5876 | .0690 | .0234 | 1809800 |

EXAMPLE 44a–44b $Cs_3(Zn_{1-m}Mg_m)Br_{5-z}Cl_z$

The samples were prepared substantially according to the method described in Examples 6 except that the samples were heated at 775° C. The amounts of materials used and nominal compositions of the final compounds are listed in Table 44. X-ray powder diffraction showed that Examples 44a and 44b crystallized in the same structure type as $Cs_3ZnCl_5$. The PSL of the samples, relative to Example 6e, is listed in Table 44.

TABLE 44

| | $Cs_3(Zn_{1-m}Mg_m)Br_{5-z}Cl_z$ (m = 0.05) | | | | | | |
|---|---|---|---|---|---|---|---|---|
| Ex | CsBr (g) | CsCl (g) | $ZnBr_2$ (g) | $ZnCl_2$ (g) | $MgCl_2$ (g) | $MgBr_2$ (g) | z | PSL (1) |
| 44a | 4.3892 | .3157 | 1.6045 | — | — | .0690 | .25 | 135109 |
| 44b | .3990 | 3.4724 | — | .9710 | .0357 | — | 4.75 | 59448 |

EXAMPLE 45a–45b $Cs_3(Zn_{1-m}Mg_m)Br_{5-z}Cl_z$:Eu

The samples were prepared substantially according to the method described in Examples 44. The amounts of materials used and nominal compositions of the final compounds are listed in Table 45. The stoichiometry of the compounds was calculated assuming that $Eu^{2+}$ substitutes for $Zn^{2+}$ in $Cs_3(Zn_{1-m}Mg_m)Br_{5-z}Cl_z$. X-ray powder diffraction showed that Examples 45a and 45b crystallized with the $Cs_3CoCl_5$ structure. The PSL of Examples 45a and 45b, relative to Example 6e, are shown in Table 45.

TABLE 45

$Cs_3(Zn_{1-m}Mg_m)Br_{5-z}Cl_z$: 0.01 Eu (m = 0.05)

| Ex | CsBr (g) | CsCl (g) | ZnBr$_2$ (g) | ZnCl$_2$ (g) | MgCl$_2$ (g) | MgBr$_2$ (g) | EuBr$_2$ (g) | EuCl$_3$ (g) | z | PSL (1) |
|---|---|---|---|---|---|---|---|---|---|---|
| 45a | 4.3892 | .3157 | 1.5876 | — | — | .0690 | .0234 | — | .25 | 2791730 |
| 45b | .3990 | 3.4724 | — | .9608 | .0357 | — | — | .0194 | 4.75 | 1314028 |

EXAMPLES 46a–46d $Cs_3(Zn_{1-f}Ca_f)Cl_5$

The samples were prepared substantially according to the method described in Example 40. The amounts of materials used and nominal compositions of the final compounds are listed in Table 46. X-ray powder diffraction patterns of Examples 46a–46d showed that a major phase crystallized with the $Cs_3ZnCl_5$ structure type. Examples 46b–46d showed extra lines which were not from the $Cs_3ZnCl_5$ structure. The PSL of the samples relative to Example 4, is listed in Table 46.

TABLE 46

$Cs_3(Zn_{1-f}Ca_f)Cl_5$

| Ex | f | CsCl (g) | ZnCl$_2$ (g) | CaCl$_2$ (g) | PSL (1) |
|---|---|---|---|---|---|
| 46a | .05 | 3.7881 | 0.9710 | .0416 | 14384 |
| 46b | .10 | 3.7881 | 0.9199 | .0832 | 11507 |
| 46c | .25 | 3.7881 | 0.7666 | .2081 | 25316 |
| 46d | .50 | 3.7881 | 0.5111 | .4162 | 52589 |

EXAMPLE 47

$Cs_3(Zn_{1-f}Ca_f)Cl_5$:Eu

The sample was prepared substantially according to the method described in Example 40. The amounts of materials used and nominal composition of the final compound are listed in Table 47. The stoichiometry of the compounds was calculated assuming that $Eu^{2+}$ substitutes for $Zn^{2+}$ in $Cs_3(Zn_{1-f}Ca_f)Cl_5$. The PSL response of the sample, relative to Example 4, is given in Table 47.

TABLE 47

$Cs_3(Zn_{1-f}Ca_f)Cl_5$: 0.01 Eu

| Ex | f | CsCl (g) | ZnCl$_2$ (g) | CaCl$_2$ (g) | EuCl$_3$ (g) | PSL (1) |
|---|---|---|---|---|---|---|
| 47 | .05 | 3.7881 | 0.9608 | .0416 | .0194 | 2767894 |

EXAMPLE 48a–48d $Cs_3(Zn_{1-f}Ca_f)Br_5$

The samples were prepared substantially according to the method described in Example 5. The amounts of materials used and nominal compositions of the final compounds are listed in Table 48. X-ray powder diffraction showed that the major phase present in Examples 48a–48d crystallized with the $Cs_3ZnBr_5$ structure. The PSL of the samples, relative to Example 5, is listed in Table 48.

TABLE 48

$Cs_3(Zn_{1-f}Ca_f)Br_5$

| Ex | f | CsBr (g) | ZnBr$_2$ (g) | CaBr$_2$ (g) | PSL (2) |
|---|---|---|---|---|---|
| 48a | .05 | 4.7884 | 1.6045 | .0750 | 9302 |
| 48b | .10 | 4.7884 | 1.5200 | .1499 | 4357 |
| 48c | .25 | 4.7884 | 1.2667 | .3748 | 8072 |
| 48d | .50 | 4.7884 | 0.8445 | .7496 | 11199 |

EXAMPLE 49

$Cs_3(Zn_{1-f}Ca_f)Br_5$:Eu

The sample was prepared substantially according to the method described in Example 5. The amounts of materials used and nominal composition of the final compound are listed in Table 49. The stoichiometry of the compounds was calculated assuming that $Eu^{2+}$ substitutes for $Zn^{2+}$ in $Cs_3(Zn_{1-f}Ca_f)Br_5$. The PSL response of Example 49 is relative to Example 5.

TABLE 49

$Cs_3(Zn_{1-f}Ca_f)Br_5$: 0.01 Eu

| Ex | f | CsBr (g) | ZnBr$_2$ (g) | CaBr$_2$ (g) | EuBr$_2$ (g) | PSL (2) |
|---|---|---|---|---|---|---|
| 49 | .05 | 4.7884 | 1.5876 | .0750 | .0234 | 679488 |

EXAMPLE 50a–50b $Cs_3(Zn_{1-f}Ca_f)Br_{5-z}Cl_z$

The samples were prepared substantially according to the method described in Example 44. The amounts of materials used and nominal compositions of the final compounds are listed in Table 50. X-ray powder diffraction showed that Examples 50a and 50b crystallized with the $Cs_3CoCl_5$ structure. The PSL of the samples, relative to Example 6e, is listed in Table 50.

TABLE 50

| | | | Cs$_3$(Zn$_{1-z}$Ca$_z$)Br$_{5-z}$Cl$_z$ (f = 0.05) | | | | |
|---|---|---|---|---|---|---|---|
| Ex | z | CsBr (g) | CsCl (g) | ZnBr$_2$ (g) | ZnCl$_2$ (g) | CaCl$_2$ (g) | CaBr$_2$ (g) | PSL (1) |
| 50a | .25 | 4.3892 | .3157 | 1.6045 | — | — | .0750 | 34279 |
| 50b | 4.75 | .3990 | 3.4724 | — | .9710 | .0416 | — | 632 |

EXAMPLES 51a–51b

Cs$_3$(Zn$_{1-f}$Ca$_f$)Br$_{5-z}$Cl$_z$:Eu

The samples were prepared substantially according to the method described in Example 44. The amounts of materials used and nominal compositions of the final compounds are listed in Table 51. The stoichiometry of the compounds was calculated assuming that Eu$^{2+}$ substitutes for Zn$^{2+}$ in Cs$_3$(Zn$_{1-f}$Ca$_f$)Br$_{5-z}$Cl$_z$. The PSL responses, relative to Example 6e, are shown in Table 51.

TABLE 51

| | Cs$_3$(Zn$_{1-f}$Ca$_f$)Br$_{5-z}$Cl$_z$: 0.01 Eu (f = 0.05) | | | | | | | | |
|---|---|---|---|---|---|---|---|---|---|
| Ex | CsBr (g) | CsCl (g) | ZnBr$_2$ (g) | ZnCl$_2$ (g) | CaCl$_2$ (g) | CaBr$_2$ (g) | EuBr$_2$ (g) | EuCl$_3$ (g) | z | PSL (1) |
| 51a | 4.3892 | .3157 | 1.5876 | — | — | .0750 | .0234 | — | .25 | 7379246 |
| 51b | — | .3990 | 3.4724 | — | .9608 | .0416 | — | — | .0194 | 4.75 | 2572468 |

EXAMPLES 52a–52d

Cs$_3$(Zn$_{1-g}$Sr$_g$)Cl$_5$

The samples were prepared substantially according to the method described in Example 40. The amounts of materials used and nominal compositions of the final compounds are listed in Table 52. X-ray powder diffraction of Examples 52a–52d showed that the major phase in each case crystallized with the Cs$_3$ZnCl$_5$ structure. Examples 52c and 52d showed extra lines which could not be attributed to the Cs$_3$ZnCl$_5$ structure. The PSL of the samples relative to example 4 is listed in Table 52.

TABLE 52

| | Cs$_3$(Zn$_{1-g}$Sr$_g$)Cl$_5$ | | | | |
|---|---|---|---|---|---|
| Ex | g | CsCl (g) | ZnCl$_2$ (g) | SrCl$_2$ (g) | PSL (1) |
| 52a | .05 | 3.7881 | 0.9710 | .0594 | 46 |
| 52b | .10 | 3.7881 | 0.9199 | .1189 | 11507 |
| 52c | .25 | 3.7881 | 0.7666 | .2972 | 30495 |
| 52d | .50 | 3.7881 | 0.5111 | .5945 | 21864 |

EXAMPLE 53

Cs$_3$(Zn$_{1-g}$Sr$_g$)Cl$_5$:0.01Eu

The sample was prepared substantially according to the method described in Example 40. The amounts of materials used and nominal composition of the final compound are listed in Table 53. The stoichiometry of the compounds was calculated assuming that Eu$^{2+}$ substitutes for Zn$^{2+}$ in Cs$_3$(Zn$_{1-g}$Sr$_g$)Cl$_5$. The PSL response of the sample, relative to Example 4, is shown in Table 53.

TABLE 53

| | Cs$_3$(Zn$_{1-g}$Sr$_g$)Cl$_5$: 0.01 Eu | | | | |
|---|---|---|---|---|---|
| Ex | g | CsCl (g) | ZnCl$_2$ (g) | SrCl$_2$ (g) | EuCl$_3$ (g) | PSL (1) |
| 53 | .05 | 3.7881 | .9608 | .0594 | .0194 | 41979 |

EXAMPLES 54a–54d

Cs$_3$(Zn$_{1-g}$Sr$_g$)Br$_5$

The samples were prepared substantially according to the method described in Example 5. The amounts of materials used and nominal compositions of the final compounds are listed in Table 54. X-ray powder diffraction of Examples 54a–54d showed that the major phase is each case crystallized with the same structure type as Cs$_3$ZnBr$_5$. The PSL of the samples, relative to Example 5, is listed in Table 54.

TABLE 54

| | Cs$_3$(Zn$_{1-g}$Sr$_g$)Br$_5$ | | | | |
|---|---|---|---|---|---|
| Ex | g | CsBr (g) | ZnBr$_2$ (g) | SrBr$_2$ (g) | PSL (2) |
| 54a | .05 | 4.7884 | 1.6045 | .0928 | 28 |
| 54b | .10 | 4.7884 | 1.5200 | .1856 | 20 |
| 54c | .25 | 4.7884 | 1.2667 | .4639 | 21 |
| 54d | .50 | 4.7884 | 0.8445 | .9279 | 16 |

EXAMPLE 55

Cs$_3$(Zn$_{1-g}$Sr$_g$)Br$_5$:Eu

The sample was prepared substantially according to the method described in Example 5. The amounts of materials used and nominal composition of the final compound are listed in Table 55. The stoichiometry of the compounds was calculated assuming that Eu$^{2+}$ substitutes for Zn$^{2+}$ in Cs$_3$(Zn$_{1-g}$Sr$_g$)Br$_5$. The PSL response of the sample, relative to Example 5, is shown in Table 55.

TABLE 55

| | | | $Cs_3(Zn_{1-g}Sr_g)Br: 0.01\ Eu$ | | | |
|---|---|---|---|---|---|---|
| Ex | g | CsBr (g) | ZnBr$_2$ (g) | SrBr$_2$ (g) | EuBr$_2$ (g) | PSL (2) |
| 55 | .05 | 4.7884 | 1.5876 | .0928 | .0234 | 41132 |

EXAMPLES 56a–56b $Cs_3(Zn_{1-g}Sr_g)Br_{5-z}Cl_z$

The samples were prepared substantially according to the method described in Example 44. The amounts of materials used and nominal compositions of the final compounds are listed in Table 56. X-ray powder diffraction of showed that both Examples 56a and 56b crystallized with the $Cs_3CoCl_5$ structure. The PSL of the samples, relative to Example 6e, is listed in Table 56.

TABLE 56

| | | $Cs_3(Zn_{1-g}Sr_g)Br_{5-z}Cl_z\ (g = 0.05)$ | | | | | |
|---|---|---|---|---|---|---|---|
| Ex | z | CsBr (g) | CsCl (g) | ZnBr$_2$ (g) | ZnCl$_2$ (g) | SrCl$_2$ (g) | SrBr$_2$ (g) | PSL (1) |
| 56a | .25 | 4.3892 | .3157 | 1.6045 | — | — | .0928 | 479 |
| 56b | 4.75 | .3990 | 3.4724 | — | .9710 | .0594 | — | 157 |

EXAMPLES 57a–57b $Cs_3(Zn_{1-g}Sr_g)Br_{5-z}Cl_z$:Eu

The samples were prepared substantially according to the method described in Example 44. The amounts of materials used and nominal compositions of the final compounds are listed in Table 57. The stoichiometry of the compounds was calculated assuming that Eu$^{2+}$ substitutes for Zn$^{2+}$ in $Cs_3(Zn_{1-g}Sr_g)Br_{5-z}Cl_z$. The PSL responses, relative to Example 6e, are listed in Table 57.

TABLE 57

| | $Cs_3(Zn_{1-g}Sr_g)Br_{5-z}Cl_z:\ 0.01\ Eu\ (g = 0.05)$ | | | | | | | | |
|---|---|---|---|---|---|---|---|---|---|
| Ex | CsBr (g) | CsCl (g) | ZnBr$_2$ (g) | ZnCl$_2$ (g) | SrCl$_2$ (g) | SrBr$_2$ (g) | EuBr$_2$ (g) | EuCl$_3$ (g) | z | PSL (1) |
| 57a | 4.3892 | .3157 | 1.5876 | — | — | .0928 | .0234 | — | .25 | 2563203 |
| 57b | .3990 | 3.4724 | — | .9608 | .0594 | — | — | .0194 | 4.75 | 1385056 |

EXAMPLES 58a–58d $Cs_3(Zn_{1-h}Ba_h)Cl_5$

The samples were prepared substantially according to the method described in Example 40. The amounts of materials used and nominal compositions of the final compounds are listed in Table 58. X-ray powder diffraction indicated that Examples 58a–58d crystallized in the same structure type as $Cs_3ZnCl_5$. The PSL of the samples, relative to Example 4, is listed in Table 58.

TABLE 58

| | $Cs_3(Zn_{1-h}Ba_h)Cl_5$ | | | | |
|---|---|---|---|---|---|
| Ex | h | CsCl$_2$ (g) | ZnCl$_2$ (g) | BaCl$_2$ (g) | PSL(1) |
| 58a | .05 | 3.7881 | .9710 | .0781 | 17261 |
| 58b | .10 | 3.7881 | .9199 | .1562 | 20138 |
| 58c | .25 | 3.7881 | .7666 | .3905 | 47536 |
| 58d | .50 | 3.7881 | .5111 | .7809 | 60989 |

EXAMPLE 59

$Cs_3(Zn_{1-h}Ba_h)Cl_5$:Eu

The sample was prepared substantially according to the method described in Example 40. The amounts of materials used and nominal composition of the final compound are listed in Table 59. The stoichiometry of the compounds was calculated assuming that Eu$^{2+}$ substitutes for Zn$^{2+}$ in $Cs_3(Zn_{1-h}Ba_h)Cl_5$. The PSL response of the sample, relative to Example 4, is shown in Table 59.

TABLE 59

| | $Cs_3(Zn_{1-h}Ba_h)Cl_5:\ 0.01\ Eu$ | | | | |
|---|---|---|---|---|---|
| Ex | h | CsCl (g) | ZnCl$_2$ (g) | BaCl$_2$ (g) | EuCl$_3$ (g) | PSL (1) |
| 59 | .05 | 3.7881 | .9608 | .0781 | .0194 | 1629459 |

EXAMPLES 60a–60d $Cs_3(Zn_{1-h}Ba_h)Br_5$

The samples were prepared substantially according to the method described in Example 5. The amounts of materials and nominal compositions of the final compounds are listed in Table 60. X-ray powder diffraction showed that in Examples 60a–60d the major phase crystallized in the same structure type as $Cs_3ZnBr_5$. The PSL of the samples, relative to Example 5, is listed in Table 60.

TABLE 60

$Cs_3(Zn_{1-h}Ba_h)Br_5$

| Ex | h | CsBr (g) | $ZnBr_2$ (g) | $BaBr_2$ (g) | PSL (2) |
|---|---|---|---|---|---|
| 60a | .05 | 4.7884 | 1.6045 | .1114 | 7432 |
| 60b | .10 | 4.7884 | 1.5200 | .2229 | 16017 |
| 60c | .25 | 4.7884 | 1.2667 | .5572 | 3767 |
| 60d | .50 | 4.7884 | .8445 | 1.1143 | 3844 |

EXAMPLE 61

$Cs_3(Zn_{1-h}Ba_h)Br_5$:Eu

The sample was prepared substantially according to the method described in Example 5. The amounts of materials used and nominal composition of the final compound are listed in Table 61. The stoichiometry of the compounds was calculated assuming that $Eu^{2+}$ substitutes for $Zn^{2+}$ in $Cs_3(Zn_{1-h}Ba_h)Br_5$. The PSL response, relative to Example 5, is shown in Table 61.

TABLE 61

$Cs_3(Zn_{1-h}Ba_h)Br_5$: 0.01 Eu

| Ex | h | CsBr (g) | $ZnBr_2$ (g) | $BaBr_2$ (g) | $EuBr_2$ (g) | PSL (2) |
|---|---|---|---|---|---|---|
| 61 | .05 | 4.7884 | 1.5876 | .1114 | .0234 | 265927 |

EXAMPLES 62a–62b $Cs_3(Zn_{1-h}Ba_h)Br_{5-z}Cl_z$

The samples were prepared substantially according to the method described in Example 44. The amounts of materials used and nominal compositions of the final compounds are listed in Table 62. X-ray powder diffraction showed that Examples 62a and 62b crystallized in the same structure type as $Cs_3ZnCl_5$. The PSL of the samples, relative to Example 6e, is listed in Table 62.

TABLE 62

$Cs_3(Zn_{1-h}Ba_h)Br_{5-z}Cl_z$

| Ex | h | CsBr (g) | CsCl (g) | $ZnBr_2$ (g) | $ZnCl_2$ (g) | $BaCl_2$ (g) | $BaBr_2$ (g) | z | PSL (1) |
|---|---|---|---|---|---|---|---|---|---|
| 62a | .05 | 4.3892 | .3157 | 1.6045 | — | — | .1114 | .25 | 373 |
| 62b | .05 | .3990 | 3.4724 | — | .9710 | .0781 | — | 4.75 | 493031 |

EXAMPLES 63a–63b $Cs_3(Zn_{1-h}Ba_h)Br_{5-z}Cl_z$:Eu

The samples were prepared substantially according to the method described in Example 44. The amounts of materials used and nominal compositions of the final compounds are listed in Table 63. The stoichiometry of the compounds was calculated assuming that $Eu^{2+}$ substitutes for $Zn^{2+}$ in $Cs_3(Zn_{1-h}Ba_h)Br_{5-z}Cl_z$. The PSL of the samples, relative to Example 6e, is listed in Table 63.

TABLE 63

$Cs_3(Zn_{1-x}Ba_h)Br_{5-z}Cl_z$: 0.01 Eu (h = 0.05)

| Ex | CsBr (g) | CsCl (g) | ZnBr$_2$ (g) | ZnCl$_2$ (g) | BaCl$_2$ (g) | BaBr$_2$ (g) | EuBr$_2$ (g) | EuCl$_3$ (g) | z | PSL (1) |
|---|---|---|---|---|---|---|---|---|---|---|
| 63a | 4.3892 | .3157 | 1.5876 | — | — | .1114 | .0234 | — | .25 | 4921350 |
| 63b | .3990 | 3.4724 | — | .9608 | .0781 | — | — | 0.194 | 4.75 | 1534062 |

EXAMPLE 64

$Cs_3(Zn_{1-m}Mg_m)_{1-o}(Ca_fSr_gBa_h)Cl_5$ where o=(f+g+h)

The sample was prepared substantially according to the method described in Example 40, except that a mixture of alkaline earth halides was added by first preparing and dehydrating a mixture of alkaline earth halide under vacuum with heat. The amounts of alkaline earth halides used to prepare the mixture are shown in Table 64. The amounts of materials used and nominal composition of the final compound are listed in Table 65. X-ray powder diffraction showed that Example 64 crystallized in the same structure type as $Cs_3ZnCl_5$. The PSL of the sample, relative to Example 4, is shown in Table 65.

TABLE 64

Preparation of Anhydrous Alkaline Earth Halide Mixtures

| Mixture 2 | MgCl$_2$ (g) | CaCl$_2$ (g) | SrCl$_2$.6H$_2$O (g) | BaCl$_2$.2H$_2$O (g) |
|---|---|---|---|---|
|  | .1071 | .1249 | .2779 | .2748 |

TABLE 65

$Cs_3(Zn_{1-m}Mg_m)_{1-o}(Ca_fSr_gBa_h)Cl_5$ where o = (f + g + h) = 0.0015 and m = 0.0005, f = 0.0005, g = 0.0005, h = 0.0005

| Ex | CsCl (g) | ZnCl$_2$ (g) | Mixture 2 (g) | PSL (1) |
|---|---|---|---|---|
| 64 | 3.7881 | 1.0201 | .0021 | 275 |

EXAMPLE 65

$Cs_3(Zn_{1-m}Mg_m)_{1-o}(Ca_fSr_gBa_h)Cl_5$:Eu where o=(f+g+h)

The sample was prepared substantially according to the method described in Example 64. The amounts of materials used and nominal composition of the final compound are listed in Table 66. The stoichiometry of the compounds was calculated assuming that Eu$^{2+}$ substitutes for Zn$^{2+}$ in the compounds. The PSL of the sample, relative to Example 4, is shown in Table 66.

TABLE 66

$Cs_3(Zn_{1-m}Mg_m)_{1-o}(Ca_fSr_gBa_h)Cl_5$: 0.01 Eu where o = (f + g + h) = 0.0015 and m = 0.0005, f = 0.0005, g = 0.0005, h = 0.0005

| Ex | CsCl(g) | ZnCl$_2$ (g) | Mixture 2 (g) | EuCl$_3$ (g) | PSL (1) |
|---|---|---|---|---|---|
| 65 | 3.7881 | 1.0099 | .0021 | .0194 | 332 |

EXAMPLE 66

$Cs_3(Zn_{1-m}Mg_m)_{1-o}(Ca_fSr_gBa_h)Br_5$ where o=(f+g+h)

The sample was prepared substantially according to the method described in Example 5, except that a mixture of alkaline earth halides was added by first preparing and dehydrating a mixture of alkaline earth halide under vacuum with heat. The amounts of alkaline earth halides used to prepare the mixture are shown in Table 67. The amounts of materials used and nominal composition of the final compound are listed in Table 68. X-ray powder diffraction showed that Example 66 crystallized in the same structure type as $Cs_3ZnBr_5$. The PSL response, relative to Example 5, is shown in Table 66.

TABLE 67

Preparation of Anhydrous Alkaline Earth Halide Mixtures

| Mixture 2: | .2072 grams | .2654 grams | .2784 grams | .3748 grams |
|---|---|---|---|---|
|  | MgBr$_2$ | CaBr$_2$:2H$_2$O | SrBr$_2$ | BaBr$_2$:2H$_2$O |

TABLE 68

$Cs_3(Zn_{1-m}Mg_m)_{1-o}(Ca_fSr_gBa_h)Br_5$ where o = (f = g + h) = 0.0015 and m = 0.0005, f = 0.0005, g = 0.0005, h = 0.0005

| Ex | CsBr (g) | ZnBr$_2$ (g) | Mixture 2 (g) | PSL (2) |
|---|---|---|---|---|
| 66 | 4.7882 | 1.6855 | .0035 | 46 |

EXAMPLE 67

$Cs_3(Zn_{1-m}Mg_m)_{1-o}(Ca_fSr_gBa_h)Br_5$:Eu where o=(f+g+h) and m=0.0005

The sample was prepared substantially according to the method described in Example 66. The amounts of materials used and nominal composition of the final compound are listed in Table 69. The stoichiometry of the compounds was calculated assuming that Eu$^{2+}$ substitutes for Zn$^{2+}$ in the compounds. The PSL response, relative to Example 5, is shown in Table 69.

TABLE 69

Preparation of $Cs_3(Zn_{1-m}Mg_m)_{1-o}(Ca_fSr_gBa_h)Br_5$: 0.01 Eu where o = (f + g + h) = 0.0015 and m = 0.0005, f = 0.0005, g = 0.0005, h = 0.0005

| Ex | CsBr (g) | ZnBr$_2$ (g) | Mixture 2 (g) | EuBr$_2$ (g) | PSL (2) |
|---|---|---|---|---|---|
| 67 | 4.7882 | 1.6686 | .0035 | .0234 | 237558 |

EXAMPLES 68a–68b $Cs_3(Zn_{1-m}Mg_m)_{1-o}(Ca_fSr_gBa_h)Br_{5-z}Cl_z$:0.01Eu where o=(f+g+h) and m=0.0005

The samples were prepared substantially according to the method described in Example 44, except that a mixture of alkaline earth halides was substituted for the individual of alkaline earth halide compound. The addendum mixture was prepared in advance by dehydrating a mixture of alkaline earth halide under vacuum with heat. The amounts of alkaline earth halides used to prepare the mixture are shown in Table 70. The amounts of materials used and nominal compositions of the final compounds are listed in Table 71. X-ray powder diffraction showed that Examples 68a and 68b crystallized in the same structure type as $Cs_3ZnCl_5$. The PSL of the samples, relative to Example 6e, is listed in Table 71.

TABLE 70

Preparation of Anhydrous Alkaline Earth Halide Mixtures (Mixture 3 and Mixture 4)

| Mixture 3: | .2072 grams $MgBr_2$ | .2654 grams $CaBr_2.2H_2O$ | .2784 grams $SrBr_2$ | .3748 grams $BaBr_2.2H_2O$ |
|---|---|---|---|---|
| Mixture 4: | .1071 grams $MgCl_2$ | .1249 grams $CaCl_2$ | .2779 grams $SrCl_2.6H_2O$ | .2748 grams $BaCl_2.2H_2O$ |

TABLE 71

$Cs_3(Zn_{1-m}Mg_m)_{1-o}(Ca_fSr_gBa_h)Br_{5-z}Cl_z$ where $o = (f + g + h) = 0.0015$ and $m = 0.0005$, $f = 0.0005$, $g = 0.0005$, $h = 0.0005$

| Ex | CsBr (g) | CsCl (g) | $ZnBr_2$ (g) | $ZnCl_2$ (g) | Mixture #3 (g) | Mixture #4 (g) | z | PSL (1) |
|---|---|---|---|---|---|---|---|---|
| 68a | 4.3892 | .3157 | 1.6855 | — | .0035 | — | .25 | 78440 |
| 68b | .3990 | 3.4724 | — | 1.0201 | — | .0021 | 4.75 | 38 |

EXAMPLE 69a–69b $Cs_3(Zn_{1-m}Mg_m)_{1-o}(Ca_fSr_gBa_h)Br_{5-z}Cl_z$:Eu where $o=(f+g+h)$ and $m=0.0005$ The samples were prepared substantially according to the method described in Examples 68a–68b, except that Eu was added as an activator cation. The amounts of materials used and nominal compositions of the final compounds are listed in Table 72. The stoichiometry of the compounds was calculated assuming that $Eu^{2+}$ substitutes for $Zn^{2+}$ in the compounds. The PSL responses, relative to Example 6e, are listed in Table 72.

TABLE 72

$Cs_3(Zn_{1-m}Mg_m)_{1-o}(Ca_fSr_gBa_h)Br_{5-z}Cl_z$: 0.01 Eu where $o = (f + g + h) = 0.0015$ and $m = 0.0005$, $f = 0.0005$, $g = 0.0005$, $h = 0.0005$

| Ex | CsBr (g) | CsCl (g) | $ZnBr_2$ (g) | $ZnCl_2$ (g) | Mixture #3 (g) | Mixture #4 (g) | z | PSL (1) |
|---|---|---|---|---|---|---|---|---|
| 69a | 4.3892 | .3157 | .6686 | — | 0035 | — | .25 | 1129045 |
| 69b | .3990 | 3.4724 | — | 1.0099 | — | .0021 | 4.75 | 1195904 |

EXAMPLE 70

$(Cs_{1-r}Rb_r)_{3-n}(Zn_{1-m}Mg_m)_{1-o}(Li_aNa_bK_c)(Ca_fSr_gBa_h)Cl_5$ where $n=(a+b+c)$, $o=(f+g+h)$ The sample was prepared substantially according to the method described in Example 64, except that the alkali metal halides were added in addition to the alkaline earth metal halides. The alkali metal halide mixtures were prepared by the methods described in Example 38. The amounts used to prepare the alkali halide mixtures are shown in Table 73. The amounts of materials used and nominal composition of the final compound are listed in Table 74. In table 74, mixture 2 refers to mixture 2 from example 64. X-ray powder diffraction showed that Example 70 crystallized in the same structure type as $Cs_3ZnCl_5$. The PSL response, relative to Example 4, is given in Table 74.

TABLE 73

Preparation of Anhydrous Alkali Halide Mixtures

| Mixture 1 | LiCl (g) | NaCl (g) | KCl (g) | RbCl (g) |
|---|---|---|---|---|
| | .0477 | .0657 | .0839 | .1360 |

TABLE 74

$(Cs_{1-r}Rb_r)_{3-n}(Zn_{1-m}Mg_m)_{1-o}(Li_aNa_bK_c)(Ca_fSr_gBa_h)Cl_5$ where
r = .0005, n = (a + b + c) = 0.0045, a = 0.0015, b = 0.0015,
c = 0.0015, m = 0.0005, o = (f + g + h) = 0.0015, and f = 0.0005,
g = 0.0005, h = 0.0005

| Ex | CsCl (g) | ZnCl$_2$ (g) | Mixture 1 (g) | Mixture 2 (g) | PSL (1) |
|---|---|---|---|---|---|
| 70 | 3.7805 | 1.0201 | .0033 | .0021 | 1102417 |

EXAMPLE 71

$(Cs_{1-r}Rb_r)_{3-n}(Zn_{1-m}Mg_m)_{1-o-j}(Li_aNa_bK_c)(Ca_fSr_gBa_h)Cl_5$:jEu where r=0.0005, n=(a+b+c), m=0.0005, o=(f+g+h), j=0.01

The sample was prepared substantially according to the method described in Example 70. The amounts of materials used and nominal composition of the final compound are listed in Table 75. In table 75 mixture 1 refers to mixture 1 from example 70 and mixture 2 refers to mixture 2 from example 64. The stoichiometry of the compounds was calculated assuming that Eu$^{2+}$ substitutes for Zn$^{2+}$ in the compounds. The PSL response, relative to Example 4, is given in Table 75.

TABLE 75

$(Cs_{1-r}Rb_r)_{3-n}(Zn_{1-m}Mg_m)_{1-o-0.01}(Li_aNa_bK_c)(Ca_fSr_gBa_h)Cl_5$: 0.01 Eu
where r = .0005, n = (a + b + c) = 0.0045, a = 0.0015, b = 0.0015,
c = 0.0015, m = 0.0005, o = (f + g + h) = 0.0015, and f = 0.0005,
g = 0.0005, h = 0.0005, j = 0.01

| Ex | CsCl (g) | ZnCl$_2$ (g) | Mixture 1 (g) | Mixture 2 (g) | EuCl$_3$ (g) | PSL (1) |
|---|---|---|---|---|---|---|
| 71 | 3.7805 | 1.0099 | .0033 | .0021 | .0194 | 888032 |

EXAMPLE 72

$(Cs_{1-r}Rb_r)_{3-n}(Zn_{1-m}Mg_m)_{1-o}(Li_aNa_bK_c)(Ca_fSr_gBa_h)Br_5$ where r=0.0005, n=(a+b+c), m=0.0005, o=(f+g+h)

The sample was prepared substantially according to the method described in Example 66 except that the alkali metal halides were added in addition to the alkaline earth metal halides. The alkali metal halide mixtures were prepared by the methods described in Example 38. The amounts used to prepare the alkali halide mixtures are shown in Table 76. The amounts of materials used and nominal composition of the final compound are listed in table 77. In table 77 mixture 2 refers to mixture 2 from example 66 and mixture 1 refers to mixture 1 from example 72 as described in table 76. X-ray powder diffraction showed that Example 72 crystallized in the same structure type as Cs$_3$ZnBr$_5$. The PSL response, relative to Example 5, is given in Table 77.

TABLE 76

Preparation of Anhydrous Alkali Halide Mixtures

| Mixture 1 | LiBr (g) | NaBr (g) | KBr (g) | RbBr (g) |
|---|---|---|---|---|
| | .0977 | .1158 | .1339 | .1860 |

TABLE 77

$(Cs_{1-r}Rb_r)_{3-n}(Zn_{1-m}Mg_m)_{1-o}(Li_aNa_bK_c)(Ca_fSr_gBa_h)Br_5$ where
r = .0005, n = (a + b + c) = 0.0045, a = 0.0015, b = 0.0015,
c = 0.0015, m = 0.0005, o = (f + g + h) = 0.0015, and f = 0.0005,
g = 0.0005, h = 0.0005

| Ex | CsBr (g) | ZnBr$_2$ (g) | Mixture 1 (g) | Mixture 2 (g) | PSL (2) |
|---|---|---|---|---|---|
| 72 | 4.7786 | 1.6855 | .0053 | .0035 | 14171 |

EXAMPLE 73

$(Cs_{1-r}Rb_r)_{3-n}(Zn_{1-m}Mg_m)_{1-o-j}(Li_aNa_bK_c)(Ca_fSr_gBa_h)Br_5$:jEu where r=0.0005, n=(a+b+c), m=0.0005, o=(f+g+h)

The sample was prepared substantially according to the method described in Example 72. The amounts of materials used and nominal composition of the final compound are listed in Table 78. In table 78 mixture 1 refers to mixture 1 from example 72 and mixture 2 refers to mixture 2 from example 66. The stoichiometry of the compounds was calculated assuming that Eu2+ substitutes for Zn$^{2+}$ in the compounds. The PSL response, relative to Example 5, is given in Table 78.

TABLE 78

$(Cs_{1-r}Rb_r)_{3-n}(Zn_{1-m}Mg_m)_{1-o-0.01}(Li_aNa_bK_c)(Ca_fSr_gBa_h)Br_5$: 0.01 Eu
where r = .0005, n = (a + b + c) = 0.0045, a = 0.0015, b = 0.0015,
c = 0.0015, m = 0.0005, o = (f + g + h) = 0.0015, and f = 0.0005,
g = 0.0005, h = 0.0005, j = 0.01

| Ex | CsBr (g) | ZnBr$_2$ (g) | Mixture 1 (g) | Mixture 2 (g) | EuBr$_2$ (g) | PSL (2) |
|---|---|---|---|---|---|---|
| 73 | 4.7786 | 1.6686 | .0053 | .0035 | .0234 | 164266 |

EXAMPLE 74a–74b $(Cs_{1-r}Rb_r)_{3-n}(Zn_{1-m}Mg_m)_{1-o}(Li_aNa_bK_c)(Ca_fSr_gBa_h)Br_{5-z}Cl_z$ where r=0.0005, n=(a+b+c), m=0.0005, o=(f+g+h), z=0.025 or 4.75

The samples were prepared substantially according to the method described in Example 68 except that a mixture of alkali metal halides were added in addition to the alkaline earth metal halide mixture and the samples were heated at 700° C. The alkaline earth metal halide mixtures were prepared according the method described in Example 68. The alkali halide mixture were prepared as described in example 38 The amounts of materials used and nominal compositions of the final compounds are listed in Table 79. In table 79 mixture 1 and 2 refer to mixtures 1 and 2 prepared according to example 38. In table 79 mixtures 3 and 4 refer to mixtures 3 and 4 from example 68. X-ray powder diffraction showed that Examples 74a and 74b crystallized in the same structure type as Cs$_3$ZnCl$_5$. The PSL of the samples, relative to Example 6e, is listed in Table 79.

TABLE 79

$Cs_{3-n}Li_aNa_bK_cRb_dZn_{1-m}Mg_eCa_fSr_gBa_hBr_{5-z}Cl_z$ where
$n = (a + b + c + d) = 0.006$ and $m = (e + f + g + h) = 0.002$

| Ex | CsCl (g) | CsBr (g) | ZnBr₂ (g) | ZnCl₂ (g) | Mixture #3 (g) | Mixture #1 (g) | Mixture #4 (g) | Mixture #2 (g) | z | PSL (1) |
|---|---|---|---|---|---|---|---|---|---|---|
| 74a | .3157 | 4.3796 | 1.6855 | — | .0035 | .0053 | — | — | .25 | 421 |
| 74b | 3.4648 | .3990 | — | 1.0201 | — | — | .0021 | .0033 | 4.75 | 38 |

EXAMPLES 75a–75b $(Cs_{1-r}Rb_r)_{3-n}(Zn_{1-m}Mg_m)_{1-o-j}(Li_aNa_bK_c)(Ca_fSr_gBa_h)Br_{5-z}Cl_z$:jEu where r=0.0005, n=(a+b+c), a=0.0015, b=0.0015, c=0.0015, m=0.0005, o=(f+g+h), and f=0.0005, g=0.0005, h=0.0005, j=0.01, z=0.25 or 4.75

The samples were prepared substantially according to the method described in Examples 74, except that Eu was added as an activator cation. The amounts of materials used and nominal compositions of the final compounds are listed in Table 80. The stoichiometry of the compounds was calculated assuming that $Eu^{2+}$ substitutes for $Zn^{2+}$ in the compounds. The PSL of the samples, relative to Example 6e, is listed in Table 80.

TABLE 80

$(Cs_{1-r}Rb_r)_{3-n}(Zn_{1-m}Mg_m)_{1-o-0.01}(Li_aNa_bK_c)(Ca_fSr_gBa_h)Br_{5-z}Cl_z$: 0.01 Eu where
r = .0005, n = (a + b + c), a = 0.0015, b = 0.0015, c = 0.0015, m = 0.0005,
o = (f + g + h), and f = 0.0005, g = 0.0005, h = 0.0005, j = 0.01, z = 0.25 or 4.75

| Ex | CsCl (g) | CsBr (g) | ZnBr₂ (g) | ZnCl₂ (g) | Mixture #3 (g) | Mixture #1 (g) | Mixture #4 (g) | Mixture #2 (g) | EuCl₃ (g) | EuBr₂(g) | z | PSL (1) |
|---|---|---|---|---|---|---|---|---|---|---|---|---|
| 75a | .3157 | 4.3796 | 1.6686 | — | .0035 | .0053 | — | — | — | .0234 | .25 | 257864 |
| 75b | 3.4648 | .3990 | — | 1.0099 | — | — | .0021 | .0033 | .0194 | — | 4.75 | 7653324 |

EXAMPLE 76

$Cs_3ZnBr_{5-i}I_i$:Eu

The samples were prepared substantially according to the method described in Examples 6. The amounts of materials used and nominal composition of the final compound are listed in Table 81. The stoichiometry of the compounds was calculated assuming that $Eu^{2+}$ substitutes for $Zn^{2+}$ in $Cs_3ZnBr_{5-i}I_i$. X-ray powder diffraction showed that Example 76 crystallized with the $Cs_3CoCl_5$ structure type. The PSL response, relative to Example 6e, is reported in Table 81.

TABLE 81

$Cs_3ZnBr_{5-i}I_i$: 0.005 Eu

| Example | z | CsI (g) | ZnBr₂ (g) | CsBr (g) | EuBr₂ (g) | PSL (1) |
|---|---|---|---|---|---|---|
| 76 | .25 | .4871 | 1.6805 | 4.3892 | .0117 | 37830 |

EXAMPLE 77

$Cs_3ZnBr_{5-z-i}Cl_zI_i$:Eu

The samples were prepared substantially according to the method described in Examples 6. The amounts of materials used and nominal composition of the final compound are listed in Table 82. The stoichiometry of the compounds was calculated assuming that $Eu^{2+}$ substitutes for $Zn^{2+}$ in $Cs_3ZnBr_{5-z-i}Cl_zI_i$. X-ray ray powder diffraction showed that Example 77 crystallized with the $Cs_3CoCl_5$ structure type. The PSL response, relative to Example 6e, is shown in Table 82.

TABLE 82

| Ex | z | i | CsCl (g) | CsI (g) | ZnBr₂ (g) | CsBr (g) | EuBr₂ (g) | PSL (1) |
|---|---|---|---|---|---|---|---|---|
| 77 | .25 | .25 | .3157 | .4871 | 1.6805 | 3.9902 | .0117 | 59757 |

EXAMPLE 78

Average refractive index of $Cs_3ZnCl_5$

The average refractive index of the $Cs_3ZnCl_5$ phosphor of Example 4 was measured as a function of wavelength using the methods previously described. Results are given in Table 83.

TABLE 83

The average refractive index of $Cs_3ZnCl_5$

| Wavelength (anstroms) | refractive index |
|---|---|
| 6500 | 1.587 |
| 6000 | 1.591 |
| 5500 | 1.597 |
| 5000 | 1.603 |
| 4500 | 1.610 |

EXAMPLE 79

Average refractive index of $Cs_3ZnBr_5$

The average refractive index of the $Cs_3ZnBr_5$ phosphor of Example 5 was measured as a function of wavelength using the methods previously described. Results are given in Table 84.

TABLE 84

The average refractive index of $Cs_3ZnBr_5$

| wavelength (angstroms) | refractive index |
|---|---|
| 6500 | 1.665 |
| 6000 | 1.670 |
| 5500 | 1.677 |

TABLE 84-continued

The average refractive index of $Cs_3ZnBr_5$

| wavelength (angstroms) | refractive index |
|---|---|
| 5000 | 1.686 |
| 4500 | 1.700 |

EXAMPLES 80a–80b

The average refractive index of the $Cs_3ZnBr_{5-z}Cl_z$:Eu phosphor of Examples 9g and 9o was measured as a function of wavelength using the methods previously described. Results are given in Tables 85 and 86, respectively.

TABLE 85

Refractive index as a function of wavelength for $Cs_3ZnBr_{5-z}Cl_z$: Eu where z = .25

| wavelength (angstroms) | refractive index |
|---|---|
| 6500 | 1.660 |
| 6000 | 1.664 |
| 5500 | 1.673 |
| 5000 | 1.684 |
| 4500 | 1.695 |

TABLE 86

Refractive index as a function of wavelength for $Cs_3ZnBr_{5-z}Cl_z$: Eu where z = 4.75

| wavelength (angstroms) | refractive index |
|---|---|
| 6500 | 1.592 |
| 6000 | 1.595 |
| 5500 | 1.599 |
| 5000 | 1.605 |
| 4500 | 1.615 |

EXAMPLE 81

The average refractive index of the $Rb_3ZnCl_5$ phosphor of Example 28d was measured using the methods previously described. The average refractive index of $Rb_3ZnCl_5$ is 1.575 at 600 nm and is 1.571 at 650 nm.

EXAMPLE 82

The average refractive index of the $Rb_3ZnBr_5$ phase of example B10d was determined at 600 nm and 650 nm. The refractive index of the uniaxial phase of $Rb_3ZnBr_5$ is 1.648 at 600 nm and is 1.643 at 650 nm.

EXAMPLE 83.1–83.34

$(Cs_{1-r}Rb_r)_{3-n+v}(Zn_{1-m}Mg_m)_{1-o-j}(Li_aNa_bK_c)(Ca_fSr_gBa_h)Br_{5-z+v}Cl_z$:Eu where r=0, n=(a+b+c)=0, m is variable, o=(f+g+h)=0, z=0, j is variable Examples 83.1 through 83.34 were prepared substantially according to the method described in Example 43 except that the value of v, m and j for each sample are as listed in Table 87. The PSL of each sample, given in units of 100× (PMT peak volts/rem exposure) is listed in table 87.

TABLE 87

| Ex | Relative response | v | j | m |
|---|---|---|---|---|
| 83.1 | .007 | −.20 | .0025 | 0.0000 |
| 83.2 | .0453 | −.15 | .0214 | .0118 |
| 83.3 | .0221 | −.15 | .0072 | .0471 |
| 83.4 | 1.9333 | −.01 | .0072 | .0118 |
| 83.5 | .3919 | −.01 | .0214 | .0471 |
| 83.6 | .0081 | −.01 | .0214 | .0118 |
| 83.7 | 38.4167 | .07 | .0135 | .0432 |
| 83.8 | 41.1167 | .13 | .0119 | .0353 |
| 83.9 | 119.88 | .18 | .0025 | .0589 |
| 83.10 | 100.55 | .27 | .0072 | .0471 |
| 83.11 | 160.2667 | .36 | .0083 | .0877 |
| 83.12 | 425.1 | .46 | .0025 | .0942 |
| 83.13 | 236.467 | .51 | .0020 | .1387 |
| 83.14 | 311.7333 | .54 | .0088 | .1256 |
| 83.15 | 505.6 | .65 | .0025 | .1271 |
| 83.16 | 369.167 | .71 | .0098 | .1279 |
| 83.17 | 138.3 | .75 | .0001 | .1487 |
| 83.18 | 418.26 | .75 | .0107 | .1630 |
| 83.19 | 538.18 | .77 | .0054 | .1503 |
| 83.20 | 624.54 | .79 | .0036 | .1426 |
| 83.21 | 516.033 | .83 | .0063 | .1801 |
| 83.22 | 617.63 | .83 | .0049 | .1548 |
| 83.23 | 489.72 | .85 | .0065 | .1568 |
| 83.24 | 417.7 | .87 | .0035 | .1377 |
| 83.25 | 595.16 | .88 | .0010 | .1349 |
| 83.26 | 423.67 | .91 | .0017 | .1477 |
| 83.27 | 553.53 | .92 | .0011 | .1510 |
| 83.28 | 528.4 | .93 | .0111 | .1684 |
| 83.29 | 512.3 | .97 | .0049 | .1794 |
| 83.30 | 781.57 | .98 | .0009 | .1433 |
| 83.31 | 539.4 | 1.06 | .0070 | .1983 |
| 83.32 | 444.47 | 1.06 | .0028 | .2245 |
| 83.33 | 595.01 | 1.16 | .0083 | .2408 |
| 83.34 | 453.4 | 1.16 | .0058 | .2100 |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A phosphor screen comprising a support and a luminescent portion including phosphor comprising a combination of species characterized by the relationship:

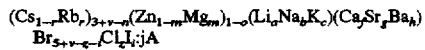

$(Cs_{1-r}Rb_r)_{3+v-n}(Zn_{1-m}Mg_m)_{1-o}(Li_aNa_bK_c)(Ca_fSr_gBa_h)Br_{5+v-z}Cl_z$:jA wherein A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

r is from 0 to 1;

v is from about 0.001 to about +1;

n is from 0 to about 1.5;

n=a+b+c;

m is from 0 to 0.5;

o=f+g+h;

a is from 0 to 0.3;

b is from 0 to 0.75;

c is from 0 to 0.75;

f is from 0 to 0.25;

g is from 0 to 0.5;

h is from 0 to 0.5;

z+i is from 0 to 5;

z is from 0 to 5;

i is from 0 to 0.5; and j is from 0.0001 to 0.15.

2. The phosphor screen of claim 1 wherein j is from about 0.0005 to about 0.05 and z is from about 4.75 to 5.0.

3. The phosphor screen of claim 1 wherein j is substantially equal to 0, i is substantially equal to 0, and z is from 0 to about 2.5.

4. The phosphor screen of claim 1 wherein j is from about 0.0005 to about 0.05 and z is from about 0 to about 1.

5. The phosphor screen of claim 4 wherein j is from about 0.0025 to about 0.02.

6. The phosphor screen of claim 1 wherein n is from 0 to about 0.005.

7. The phosphor screen of claim 1 wherein n is about 0.

8. A phosphor screen comprising a support and a luminescent portion including phosphor comprising a combination of species characterized by the relationship:

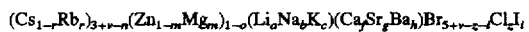

wherein r is from 0 to 1;

v is from about −0.01 to about +1;

n is from 0 to about 1.5;

n=a+b+c;

m is from 0 to 0.5;

o=f+g+h;

a is less than or equal to about 0.15;

b is from 0 to 0.75;

c is from 0 to 0.75;

f is from 0 to 0.25;

g is from 0 to 0.5;

h is from 0 to 0.5;

z+i is from 0 to 5;

z is about 0.25; and i is from 0 to 0.5.

9. The phosphor screen of claim 1 wherein b is from 0 to 0.3.

10. The phosphor screen of claim 1 wherein j is about 0, z is less than 5, and b is less than or equal to about 0.3.

11. The phosphor screen of claim 10 wherein j is about 0, z is from 0 to about 0.25, and b is less than or equal to about 0.15.

12. The phosphor screen of claim 1 wherein j is about 0, z is from 0 to about 0.25, and c is from 0 to about 0.75.

13. A phosphor screen comprising a support and a luminescent portion including phosphor comprising a combination of species characterized by the relationship:

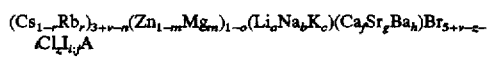

wherein

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

r is greater than 0 and less than about 0.25;

v is from about −0.01 to about +1;

n is from 0 to about 1.5;

n=a+b+c;

m is from 0 to 0.5;

o=f+g+h;

a is less than or equal to about 0.15;

b is from 0 to 0.75;

c is from 0 to 0.75;

f is from 0 to 0.25;

g is from 0 to 0.5;

h is from 0 to 0.5;

z+i is from 0 to 5;

z is about 0.25;

i is from 0 to 0.5; and j is from 0 to 0.2.

14. The phosphor screen of claim 13 wherein j is from about 0.0001 to about 0.2.

15. A phosphor screen comprising a support and a luminescent portion including phosphor comprising a combination of species characterized by the relationship:

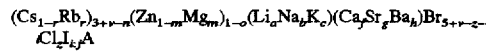

wherein

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

r is about 1;

v is from about −0.01 to about +1;

n is from 0 to about 1.5;

n=a+b+c;

m is from 0 to 0.5;

o=f+g+h;

a is less than or equal to about 0.15;

b is from 0 to 0.75;

c is from 0 to 0.75;

f is from 0 to 0.25;

g is from 0 to 0.5;

h is from 0 to 0.5;

z+i is from 0 to 5;

z is about 0.25;

i is from 0 to 0.5; and j is from about 0.0001 to 0.02.

16. A phosphor screen comprising a support and a luminescent portion including phosphor comprising a combination of species characterized by the relationship:

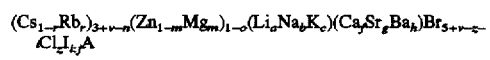

wherein

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

r is about 1;

v is from about −0.01 to about +1;

n is from 0 to about 1.5;

n=a+b+c;

m is from 0 to 0.5;

o=f+g+h;

a is less than or equal to about 0.15;

b is from 0 to 0.75;

c is from 0 to 0.75;

f is from 0 to 0.25;

g is from 0 to 0.5;

h is from 0 to 0.5;

z+i is from 0 to 5;

z is from 0 to about 0.25;

i is from 0 to 0.5; and j is from 0 to 0.15.

17. The phosphor screen of claim 16 wherein j is from about 0.0001 to about 0.02.

18. A phosphor screen comprising a support and a luminescent portion including phosphor comprising a combination of species characterized by the relationship:

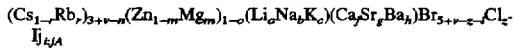

wherein

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

r is from 0 to 1;

v is from about −0.01 to about +1;

n is from 0 to about 1.5;

n=a+b+c;

m is greater than 0 and less than or equal to about 0.5, with the proviso that if z is about 5 and j is about 0, then m is less than or equal to about 0.25;

o=f+g+h;

a is less than or equal to about 0.15;

b is from 0 to 0.75;

c is from 0 to 0.75;

f is from 0 to 0.25;

g is from 0 to 0.5;

h is from 0 to 0.5;

z+i is from 0 to 5;

z is about 0.25;

i is from 0 to 0.5; and j is from 0 to 0.15.

19. The phosphor screen of claim 18 wherein z is from about 0 to about 0.25.

20. The phosphor screen of claim 19 wherein m is less than about 0.25.

21. A phosphor screen comprising a support and a luminescent portion including phosphor comprising a combination of species characterized by the relationship:

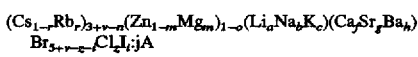

wherein

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

r is from 0 to 1;

v is from about −0.01 to about +1;

n is from 0 to about 1.5;

n=a+b+c;

m is from 0 to 0.5;

o=f+g+h;

a is from 0 to 0.3;

b is from 0 to 0.75;

c is greater than 0 and less than or equal to about 0.5;

f is from 0 to 0.25;

g is from 0 to 0.5;

h is from 0 to 0.5;

z+i is from 0 to 5;

z is from 0 to 5;

i is from 0 to 0.5; and j is from 0 to 0.15.

22. The phosphor screen of claim 21 wherein z is from about 0 to about 0.25 and c is less than or equal to about 0.5.

23. A phosphor screen comprising a support and a luminescent portion including phosphor comprising a combination of species characterized by the relationship:

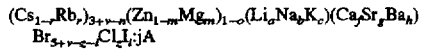

wherein

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

r is from 0 to 1;

v is from about −0.01 to about +1;

n is from 0 to about 1.5;

n=a+b+c;

m is from 0 to 0.5;

o=f+g+h;

a is from 0 to 0.3;

b is from 0 to 0.75;

c is from 0 to 0.75;

f is from 0 to 0.25;

g is greater than 0 and less than or equal to about 0.5, with the provisos that if j is about 0 then z is greater than 0 and if j is about 0 and z is about 5 then g is greater than about 0.10;

h is from 0 to 0.5;

z+i is from 0 to 5;

z is from 0 to 5;

i is from 0 to 0.5; and j is from 0 to 0.15.

24. A phosphor screen comprising a support and a luminescent portion including phosphor comprising a combination of species characterized by the relationship:

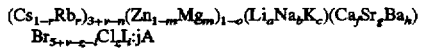

wherein

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

r is from 0 to 1;

v is from about −0.01 to about +1;

n is from 0 to about 1.5;

n=a+b+c;

m is from 0 to 0.5;

o=f+g+h;

a is from 0 to 0.3;

b is from 0 to 0.75;

c is from 0 to 0.75;

f is from 0 to 0.25;

g is from 0 to 0.5;

h is greater than 0 and less than or equal to about 0.5;

z+i is from 0 to 5;

z is from 0 to 5;

i is from 0 to 0.5; and j is from 0 to 0.15.

25. The phosphor screen of claim 24 wherein z is about 5 and h is greater than about 0.1.

26. The phosphor screen of claim 24 wherein j is greater than about 0.0005 and less than about 0.02.

27. The phosphor screen of claim 24 wherein j is about 0 and z is about 0.

28. The phosphor screen of claim 27 wherein h is about 0.10.

29. The phosphor screen of claim 24 wherein j is about 0 then z is from about 4.75 to about 5.

30. The phosphor screen of any one of claims 1, 8, 13, 15, 16, 18, 23 or 24 wherein said phosphor crystals and said binder each have substantially the same average refractive index, in at least one monochromatic wavelength band in the range of 450 to 1000 nm.

31. The phosphor screen of claim 30 wherein said average index of refraction is in the range of from about 1.55 to about 1.73.

32. The phosphor screen of claim 30 wherein 0<z<5 and said phosphor crystals have an average index of refraction for light throughout the range of 450 nm to 1000 nm that is less than the index of refraction of phosphor crystals differing in composition only in that z=0 and greater than the index of refraction of phosphor crystals differing in composition only in that z=5.

33. The phosphor screen of claim 32 wherein said phosphor crystals have an average index of refraction at 450 nm that is greater than 1.610 and less than 1.700 and have an average index of refraction at 650 nm that is greater than 1.587 and less than 1.665.

34. The phosphor screen of any one of claims 1, 8, 13, 15, binder each have substantially the same average refractive index, in at least one monochromatic wavelength band in the range of 450 to 1000 nm.

31. The phosphor screen of claim 30 wherein said average index of refraction is in the range of from about 1.55 to about 1.73.

32. The phosphor screen of claim 30 wherein 0<z<5 and said phosphor crystals have an average index of refraction for light throughout the range of 450 nm to 1000 nm that is less than the index of refraction of phosphor crystals differing in composition only in that z=0 and greater than the index of refraction of phosphor crystals differing in composition only in that z=5.

33. The phosphor screen of claim 32 wherein said phosphor crystals have an average index of refraction at 450 nm that is greater than 1.610 and less than 1.700 and have an average index of refraction at 650 nm that is greater than 1.587 and less than 1.665.

34. The phosphor screen of any one of claims 1, 8, 13, 15, 16, 18, 23 or 24 wherein said screen is a radiographic storage phosphor panel.

35. A composition of matter comprising a combination of species characterized by the relationship:

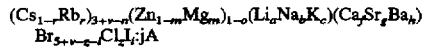

wherein

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

r is from 0 to 1;

v is from about 0.001 to about +1;

n is from 0 to about 1.5:

n=a+b+c;

m is from 0 to 0.5;

o=f+g+h;

a is from 0 to 0.3;

b is from 0 to 0.75;

c is from 0 to 0.75;

f is from 0 to 0.25;

g is from 0 to 0.5;

h is from 0 to 0.5;

z+i is from 0 to 5;

z is from 0 to 5;

i is from 0 to 0.5; and j is from 0.0001 to 0.15.

36. A method for preparing a storage phosphor screen for use with a stimulation light source having a predetermined wavelength band, said method comprising the steps of:

selecting a polymeric binder having a first index of refraction at said wavelength band;

making phosphor crystals, said crystals comprising a combination of species characterized by the relationship:

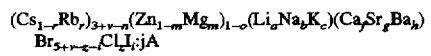

wherein

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof, r is from 0 to 1;

v is from about −0.01 to about +1;

n is from 0 to about 1.5:

n=a+b+c;

m is from 0 to 0.5;

o=f+g+h;

a is from 0 to 0.3;

b is from 0 to 0.75;

c is from 0 to 0.75;

f is from 0 to 0.25;

g is from 0 to 0.5;

h is from 0 to 0.5;

z+i is from 0 to 5;

i is from 0 to 0.5; and j is from 0 to 0.15.;

z is from zero to 5 and $z/5=(r^1-r^a)/(r^b-r^a)$ wherein $r^1$ is said first index of refraction, $r^a$ is a second index of refraction at the same wavelength band, said second index being exhibited by phosphor crystals having the same composition except that z=5, and $r^b$ is a third index of refraction at the same wavelength band, said third index being exhibited by phosphor crystals having the same composition except that z=0;

admixing said binder and said phosphor crystals; and placing said binder and said phosphor crystals on a support.

* * * * *